United States Patent [19]

Salas et al.

[11] Patent Number: 5,317,686
[45] Date of Patent: May 31, 1994

[54] DATA PROCESSING APPARATUS AND METHOD FOR A REFORMATTABLE MULTIDIMENSIONAL SPREADSHEET

[75] Inventors: R. Pito Salas, Arlington; Glenn D. Edelson, Boston; Paul S. Kleppner, Cambridge; Robert S. Shaver, Watertown, all of Mass.

[73] Assignee: Lotus Development Corporation, Cambridge, Mass.

[21] Appl. No.: 33,052

[22] Filed: Mar. 10, 1993

Related U.S. Application Data

[63] Continuation of Ser. No. 580,320, Sep. 10, 1990, abandoned.

[51] Int. Cl.$^5$ .............................................. G06F 15/62
[52] U.S. Cl. .................................... 395/157; 395/157; 395/161
[58] Field of Search ................................ 395/154–161, 395/152, 148, 144, 145–147, 149–151, 153, 800, 119

[56] References Cited

U.S. PATENT DOCUMENTS

| | | | |
|---|---|---|---|
| 4,601,003 | 7/1986 | Yoneyama et al. | 395/159 |
| 4,712,191 | 12/1987 | Penna | 395/159 |
| 4,899,136 | 2/1990 | Beard et al. | 395/157 |
| 4,901,221 | 2/1990 | Kodosky et al. | 395/161 |
| 5,018,077 | 5/1991 | Healey | 395/148 |
| 5,033,009 | 7/1991 | Dubnoff | 395/148 |
| 5,043,916 | 8/1991 | Kawai | 395/144 |
| 5,055,998 | 10/1991 | Wright et al. | 395/800 |
| 5,065,347 | 11/1991 | Pajak et al. | 395/159 |
| 5,093,907 | 3/1992 | Hwong et al. | 395/152 |

FOREIGN PATENT DOCUMENTS

| | | |
|---|---|---|
| 0294187 | 12/1988 | European Pat. Off. . |
| 0325081 | 7/1989 | European Pat. Off. . |
| 0410452A2 | 1/1991 | European Pat. Off. . |

OTHER PUBLICATIONS

1-2-3 Release 2.2 Quick Reference, 1989, pp. 1–13, 18–19, 38–49, 57–58, 62–65, 86–154.
Microsoft Works User's Guide, 1989, pp. 103–143.
Antonoff, "New Dimensions for Spreadsheets", Personal Computing, Mar. 1988, pp. 122–130.
Jackson, "Graphic Expansion", PC User, Apr. 11, 1990, p. 48(6).
Stinson, "1-2-3, Release 3", PC Magazine, Sep. 12, 1989, pp. 33–36.
Lucid 3–D Tutorial Guide, Personal Computer Support Group, Inc., 1987, pp. 15-26–15-27, Chpts. 16, 22–23, 17–1.
"Number Crunching Takes On New Dimensions" by Judy Duncan, Info World, Product Comparison Section pp. 51–59, Jul. 9, 1990.
Tore Risch et al., "A Functional Approach to Integrating Database and Expert Systems", Communications of the ACM, Dec. 1988, vol. 31, No. 12, pp. 1424–1437.
Weichang Du et al., "A 3D Spreadsheet Based on Intensional Logic", IEEE Software, May 1990, No. 3, Los Alamitos, Calif., pp. 78–89.

Primary Examiner—Heather R. Herndon
Assistant Examiner—John E. Breene
Attorney, Agent, or Firm—Hamilton, Brook, Smith & Reynolds

[57] ABSTRACT

Spreadsheet apparatus enables reformatting and renaming of items forming the spreadsheet. A series of items forms a dimension along an axis of the spreadsheet. A label icon or labelling entity is user nameable to describe the series of items of an axis. Repositioning of the label icons repositions respective series of items and thus redefines/rearranges the axes of the spreadsheet. Subaxes to an axis are similarly formed by series of items associated with a respective label icon. Order of label icons in predefined areas of a working screen view determine hierarchy of main axis and sub-axes for the label icons. There is a different predefined area for the possible vertical axes, possible horizontal axes, and the possible orthogonal axes of the spreadsheet. A cell module holds spreadsheet data in a matrix of memory cells. A symbol table translates between current specified names of items in the spreadsheet and indexes to cells of the cell module. Thus, a user is able to rearrange and/or relabel icons in the spreadsheet screen view to reformat the spreadsheet, and the supporting computer members provide display of the spreadsheet rearranged according to position of the icons without losing data of the items as held in respective intersections of the spreadsheet.

38 Claims, 20 Drawing Sheets

| Comp | | | | | | | | | | Year | |
|------|---|---|---|---|---|---|---|---|---|---|---|
| Actual | Country | | | | | | | | | Vehicle | |
| | Domestic | | | | | | | | | | |

| | | Car 2 Main | | | | | | | | |
|---|---|---|---|---|---|---|---|---|---|---|
| | | 1988 | | | | 1987 | | | | |
| | | Sports | Sedan | Van | Truck | Sports | Sedan | Van | | |
| Ford | Units | 78 | 118 | 43 | 78 | 78 | 118 | 43 | | |
| | Invoice | 7766 | 8453 | 11234 | 7765 | 7766 | 8453 | 11234 | | |
| | Retail | 8707.5 | 10566.3 | 14042.5 | 9706.25 | 9707.5 | 10566.3 | 14042.5 | | |
| | Gross | 757185 | 1246818 | 603828 | 757088 | 757185 | 1246818 | 603828 | | |
| | Net | 151437 | 249364 | 120766 | 151418 | 151437 | 248364 | 120766 | | |
| Chevrolet | Units | 66 | 85 | 11 | 54 | 68 | 85 | 11 | | |
| | Invoice | 7888 | 8211 | 12344 | 6675 | 7889 | 9211 | 12344 | | |
| | Retail | 8873.75 | 11513.8 | 15430 | 8343.75 | 8873.75 | 11513.8 | 15430 | | |
| | Gross | 651668 | 1083806 | 169730 | 450563 | 651668 | 1093806 | 169730 | | |
| | Net | 130334 | 218761 | 33946 | 90112.5 | 130334 | 218781 | 33848 | | |
| Saab | Units | 78 | 118 | 43 | 78 | 78 | 118 | 43 | | |
| | Invoice | 7766 | 8453 | 11234 | 7765 | 7766 | 8453 | 11234 | | |
| | Retail | 9707.5 | 10566.3 | 14042.5 | 8706.25 | 9707.5 | 10566.3 | 14042.5 | | |
| | Gross | 757185 | 1248818 | 803828 | 757088 | 757185 | 1246818 | 603828 | | |
| | Net | 151437 | 249364 | 120766 | 151418 | 151437 | 249364 | 120766 | | |
| Make | Measurement | | | | | | | | | Calc. |

1. Retail = Invoice 1.25
2. Gross = Retail Units
3. Net = (Retail − Invoice) Units

| | | | | Car 2 Main | | | | Year |
|---|---|---|---|---|---|---|---|---|
| Comp | Country | Units | | | | | | Vehicle |
| Actual | Domestic | | | | 1988 | | | |
| | | | | Sports | Sedan | Van | Truck | Total |
| | | | | 1988 | | | | |
| Domestic | Ford | Units | Actual | 81.5 | 123.9 | 45.15 | 81.8 | 332.85 |
| | | | Forecast | 0 | 0 | 0 | 0 | 0 |
| | | Invoice | Actual | 7766 | 8459 | 11234 | 7765 | 35218 |
| | | | Forecast | 0 | 0 | 0 | 0 | 0 |
| | | Retail | Actual | 8707.5 | 10566.3 | 14042.5 | 9706.25 | 44022.5 |
| | | | Forecast | 0 | 0 | 0 | 0 | 0 |
| | | Gross | Actual | 785044 | 1308158 | 654019 | 794942 | 1.5E+07 |
| | | | Forecast | 0 | 0 | 0 | 0 | 0 |
| | | Net | Actual | 159009 | 261832 | 126804 | 156966 | 2930578 |
| | | | Forecast | 0 | 0 | 0 | 0 | 0 |
| | Chevrolet | Units | Actual | 69.3 | 99.75 | 11.55 | 56.7 | 237.3 |
| | | | Forecast | 0 | 0 | 0 | 0 | 0 |
| | | Invoice | Actual | 7699 | 9211 | 12344 | 6675 | 36128 |
| | | | Forecast | 0 | 0 | 0 | 0 | 0 |
| | | Retail | Actual | 8873.75 | 11513.8 | 15430 | 8343.75 | 45161.3 |
| | | | Forecast | 0 | 0 | 0 | 0 | 0 |
| Country | | | | | | | | Calc. |

1. Retail = Invoice 1.25
2. Gross = Retail Units
3. Net = (Retail - Invoice) Units
4. Total = sum (Vehicle) SKIP Retail:Total, Gross:Total, Net:Total,
5. Units: Year(THIS) = Units:Year(NEXT) 1.05

Car 2 Main

| Comp | Country |  |  |  |  |  |  |  | Year |
|------|---------|--|--|--|--|--|--|--|------|
| Actual | Domestic |  |  |  |  |  |  |  | Vehicle |

| Make | Measurement | 1988 Sports | 1988 Sedan | 1988 Van | Truck | 1987 Sports | 1987 Sedan | 1987 Van |
|------|-------------|-------------|------------|----------|-------|-------------|------------|----------|
| Ford | Units | 78 | 118 | 43 | 78 | 78 | 118 | 43 |
|      | Invoice | 7766 | 8433 | 11234 | 7765 | 7766 | 8453 | 11234 |
|      | Retail | 8707.5 | 10566.3 | 14042.5 | 9706.25 | 8707.5 | 10566.3 | 14042.5 |
|      | Gross | 757185 | 1246818 | 603828 | 757088 | 757185 | 1246818 | 603828 |
|      | Net | 151437 | 249364 | 120766 | 151418 | 151437 | 249364 | 120766 |
| Chevrolet | Units | 66 | 95 | 11 | 54 | 66 | 95 | 11 |
|      | Invoice | 7899 | 8211 | 12344 | 6675 | 7898 | 8211 | 12344 |
|      | Retail | 8873.75 | 11513.8 | 15430 | 8343.75 | 9873.75 | 11513.8 | 15430 |
|      | Gross | 651668 | 1093806 | 169730 | 450563 | 651668 | 1093806 | 169730 |
|      | Net | 130334 | 218781 | 33846 | 80112.5 | 130334 | 218761 | 33946 |
| Saab | Units | 78 | 118 | 43 | 78 | 78 | 118 | 43 |
|      | Invoice | 7766 | 8453 | 11234 | 7765 | 7766 | 8453 | 11234 |
|      | Retail | 9707.5 | 10566.3 | 14042.5 | 9706.25 | 9707.5 | 10566.3 | 14042.5 |
|      | Gross | 757185 | 1246818 | 603828 | 757088 | 757185 | 1246818 | 603828 |
|      | Net | 151437 | 249364 | 120766 | 151418 | 151437 | 249364 | 120766 |

| Calc |
|------|

1. Retail = Invoice 1.25
2. Gross = Retail Units
3. Net = (Retail − Invoice) Units

| Comp | Country | Measurement | | Car 2 Main | | | | | | Year |
|---|---|---|---|---|---|---|---|---|---|---|
| Actual | Domestic | Units | | | | | | | | Vehicle |
| | | | | 1988 | | | | | 1987 | |
| | | | Sports | Sedan | Van | Truck | Veh Total | Sports | Sedan | |
| US Made | Ford | | 81.9 | 123.0 | 45.15 | 81.9 | 332.85 | 78 | 118 | |
| | Chevrolet | | 69.3 | 99.75 | 11.55 | 56.7 | 297.3 | 66 | 95 | |
| | Total | | 151.2 | 223.85 | 56.7 | 138.6 | 570.15 | 144 | 213 | |
| Non US Made | SAAB | | | 123.9 | 45.15 | 81.9 | 332.85 | 78 | 116 | |
| | BMW | | 69.3 | 99.75 | 11.55 | 56.7 | 237.9 | 86 | 95 | |
| | Total | | 151.2 | 223.85 | 56.7 | 138.6 | 570.15 | 144 | 213 | |

| Make | | Calc. |
|---|---|---|

Made Total: Invoice: Veh Total
5. Units:Year[THIS] - Units:Year[NEXT] 1.05 SKIP 1988:Non US Made Total:
      Units, 1988:US Made Total:Units
6. US Made Total = group sum (US Made)
7. Non US Made Total = group sum (Non US Made)

Car 2 Main

| Comp | Country | | 1988 | | | | 1987 | | |
|---|---|---|---|---|---|---|---|---|---|
| Actual | Domestic | Units | Sports | Sedan | Van | Truck | Veh Total | Sports | Sedan | Van |
| US Made | Total | | 151.2 | 223.85 | 56.7 | 138.6 | 570.15 | 144 | 213 | 54 |
| Non US Made | Total | | | 223.85 | 56.7 | 138.5 | 570.15 | 144 | 213 | 54 |

| Make | Measurement | Calc. |
|---|---|---|

Made Total
5. Units:Year[THIS] - Units:Year[NEXT] 1.05 SKIP 1988:Non US Made
   Total:Units, 1988:US Made Total:Units
6. US Made Total = group sum (US Made)
7. Non US Made Total = group sum (Non US Made)

FIG. 3c

| Comp | Country | | | | 1988 | | | | 1987 | | Year |
|---|---|---|---|---|---|---|---|---|---|---|---|
| Actual | Domestic | Units | | | | | | | | | Vehicle |
| | | | Sports | Sedan | Van | Truck | Total | Sports | Sedan | | |
| Units | Ford | | 81.9 | 123.9 | 45.15 | 81.9 | 332.85 | 78 | 118 | | |
| | Chevrolet | | 58.3 | 8.75 | 11.55 | 56.7 | 237.3 | 66 | 95 | | |
| | SAAB | | 81.9 | 123.9 | 45.15 | 81.8 | 382.85 | 78 | 118 | | |
| Invoice | Ford | | 7766 | 8453 | 11234 | 7765 | 35218 | 7766 | 8453 | | |
| | Chevrolet | | 7899 | 9211 | 12344 | 6675 | 36129 | 7899 | 9211 | | |
| | SAAB | | 7768 | 8453 | 11234 | 7765 | 35218 | 7765 | 8453 | | |
| Retail | Ford | | 9707.5 | 10566.3 | 14042.5 | 9706.25 | 44022.5 | 9707.5 | 10566.3 | | |
| | Chevrolet | | 9973.75 | 11513.8 | 15430 | 8343.75 | 45161.3 | 9873.75 | 11513.8 | | |
| | SAAB | | 9707.5 | 10566.3 | 14042.5 | 9706.25 | 44022.5 | 9707.5 | 10566.3 | | |
| Gross | Ford | | 785044 | 1309158 | 634018 | 784842 | 1.5E+07 | 757185 | 1246818 | | |
| | Chevrolet | | 684251 | 1148487 | 178217 | 479091 | 1.1E+07 | 651668 | 1093806 | | |
| | SAAB | | 785044 | 1309158 | 634019 | 784842 | 1.5E+07 | 757185 | 1246818 | | |
| Net | Ford | | 159009 | 261832 | 126804 | 158888 | 2830578 | 151437 | 248364 | | |
| | Chevrolet | | 136850 | 228699 | 35643.9 | 94618.1 | 2143353 | 130334 | 218761 | | |
| | SAAB | | 159009 | 261832 | 126804 | 158888 | 2830578 | 151437 | 2483641 | | |
| Measure | Make | | | | | | | | | | Calc. |

.Made Total
✓ 5. Units:Year[THIS] - Units:Year[NEXT] 1.05 SKIP 1988:Non US Made
       Total:Units, 1988:US Made Total:Units
✓ 6. US Made Total = group sum (US Made)
✓ 7. Non US Made Total = group sum (Non US Made)

FIG. 3d

Car 2 Main

| Comp | Country | Actual Units Measurement | | 1988 | Year Vehicle 1987 |
|---|---|---|---|---|---|
| Domestic | | Sports | US Made | Ford | 81.9 | 78 |
| | | | | Chevrolet | 69.3 | 55 |
| | | | | Total | 151.2 | 144 |
| | | | Non US Made | SAAB | 81.9 | 78 |
| | | | | BMW | 69.3 | 55 |
| | | | | Total | 151.2 | 144 |
| | | Sedan | US Made | Ford | 123.8 | 118 |
| | | | | Chevrolet | 88.75 | 85 |
| | | | | Total | 223.85 | 213 |
| | | | Non US Made | SAAB | 123.8 | 118 |
| | | | | BMW | 88.75 | 85 |
| | | | | Total | 223.85 | 213 |
| | | Van | US Made | Ford | 45.15 | 43 |
| | | | | Chevrolet | 11.55 | 11 |
| | | | | Total | 56.7 | 54 |
| | | | Non US Made | SAAB | 45.15 | 43 |
| | | | | BMW | 11.55 | 11 |
| | | | | Total | 56.7 | 54 |

Country | Vehicle | Calc

3. Net = (Retail – Invoice) *Units SKIP Non US Made. Total:Net, US Made.
4. In 1987;Units, Vehicle. Veh Total = sum(Vehicle) SKIP 1987:US Made.
5. Units: Year[THIS] = Units:Year[NEXT] *1.05 SKIP 1988:Non US Made.
   Total:Units, 1988:US Made. Total:Units
6. US Made Total = groupsum (US Made)

FIG. 3e

| Comp | 12e | 12f | | Car 2 Main | | | | | | | Year | |
|---|---|---|---|---|---|---|---|---|---|---|---|---|
| Actual | Country | | | 14 ↓ | | 20 ↓ | | | | | Vehicle | |
| | Domestic | | | 1988 | | | | 1987 | | | | |
| | | | Sports | Sedan | Van | Truck | Sports | Sedan | Van | | | |
| Ford | Units | | 78 | 118 | 43 | 78 | 78 | 118 | 43 | | | |
| | Invoice | | 7766 | 8453 | 11234 | 7765 | 7766 | 8453 | 11234 | | | |
| | Retail | | 8707.5 | 10566.3 | 14042.5 | 9706.25 | 9707.50 | 10566.3 | 14042.5 | | | |
| | Gross | | 757185 | 1246818 | 603828 | 757088 | 757185 | 1246818 | 603828 | | | |
| | Net | | 151437 | 249364 | 120766 | 151418 | 151437 | 249364 | 120766 | | | |
| Chevrolet | Units | | 66 | 85 | 11 | 54 | 66 | 85 | 11 | | | |
| | Invoice | | 7889 | 9211 | 12344 | 6675 | 7899 | 9211 | 12344 | | | |
| | Retail | | 8873.75 | 11513.8 | 15430 | 8343.75 | 9873.75 | 11513.8 | 15430 | | | |
| | Gross | | 851668 | 1083806 | 168730 | 450563 | 651668 | 1093808 | 169730 | | | |
| | Net | | 130334 | 218761 | 33946 | 90112.5 | 130334 | 218761 | 33946 | | | |
| Saab | Units | | 78 | 118 | 43 | 78 | 79 | 118 | 43 | | | |
| | Invoice | | 7766 | 6453 | 11234 | 7765 | 7766 | 8453 | 11234 | | | |
| | Retail | | 9707.5 | 10566.3 | 14042.5 | 9706.25 | 9707.5 | 10566.3 | 14042.5 | | | |
| | Gross | | 757185 | 1246818 | 603828 | 757088 | 757185 | 1246818 | 803828 | | | |
| | Net | | 151437 | 249364 | 120766 | 151418 | 151437 | 249364 | 120766 | | | |
| Make | Measurement | | | | | | | | | | Calc | |

1. Retail = Invoice * 1.25
2. Gross = Retail * Units
3. Net = (Retail−Invoice) * Units

| Make | Measure | | Calc. |
|---|---|---|---|
| | 45a | | |
| ✓ | 3. Net = (Retail - Invoice) * Units SKIP Non US Made. Total:Net,US Made. Total:Net | | |
| ✓ | 4. In 1987:Units, Vehicle. Veh Total = sum(Vehicle)  SKIP 1987:US Made. Total:Units:Veh Total, 1987:Non US Made.  Total:Units:Veh Total | | |
| ✓ | 5. Units: Year[THIS] =Units:Year[NEXT]*1.05  SKIP 1988:Non US Made. Total:Units, 1988:US Made.  Total:Units | | |
| ✓ | 6. US Made Total = groupsum (US Made) | | |

Car 2 Main

| Comp | Country | | | | | | | | Year | |
|---|---|---|---|---|---|---|---|---|---|---|
| Actual | Domestic | | | | | | | | Vehicle | |
| | | | 1988 | | | | | 1987 | | |
| | | Sports | Sedan | Van | Truck | Total | Sports | Sedan | | |
| Ford | Units | 78 | 118 | 43 | 78 | 317 | 78 | 118 | | |
| | Invoice | 7766 | 8453 | 11234 | 7765 | 33218 | 7766 | 8453 | | |
| | Retail | 9707.5 | 10566.3 | 14042.3 | 9706.25 | Overlap | 9707.5 | 10566.3 | | |
| | Gross | 757185 | 1246818 | 603828 | 757083 | Overlap | 757185 | 1246818 | | |
| | Net | 151437 | 248364 | 120766 | 151418 | Overlap | 151437 | 249364 | | |
| Chevrolet | Units | 66 | 95 | 11 | 54 | 238 | 66 | 95 | | |
| | Invoice | 7898 | 9211 | 12344 | 6675 | 33128 | 7899 | 9211 | | |
| | Retail | 8873.75 | 11513.8 | 15430 | 8343.75 | Overlap | 8873.75 | 11513.8 | | |
| | Gross | 851688 | 1093806 | 169730 | 450583 | Overlap | 651668 | 1083808 | | |
| | Net | 130334 | 218761 | 33946 | 90112.5 | Overlap | 180334 | 218761 | | |
| Saab | Units | 78 | 118 | 43 | 78 | 317 | 78 | 118 | | |
| | Invoice | 776 | 8453 | 11234 | 7785 | 33278 | 7766 | 8453 | | |
| | Retail | 9707.5 | 10566.3 | 14042.5 | 9706.25 | Overlap | 9707.5 | 10566.3 | | |
| | Gross | 757185 | 1246818 | 603828 | 757088 | Overlap | 7571285 | 1246618 | | |
| | Net | 151437 | 249364 | 120766 | 151418 | Overlap | 151437 | 248364 | | |
| Make | Measurement | | | | | | | | Calc | |

1. Retail = Invoice * 1.25
2. Gross = Retail = Units
3. Net = (Retail = Invoice) Units
4. Total = Sum (Vehicle)

FIG. 5a

| Comp | Country | Car 2 Main | | | | | | | Year |
|---|---|---|---|---|---|---|---|---|---|
| Actual | Domestic | | | | | | | | Vehicle |
| | | | 1988 | | | | | | 1987 |
| | | | Sports | Sedan | Van | Truck | Total | | Sports |
| Ford | | Units | 78 | 118 | 43 | 78 | 317 | | 78 |
| | | Invoice | 7766 | 8453 | 11234 | 7765 | 35218 | | 7766 |
| | | Retail | 9707.5 | 10566.3 | 14042.5 | 9706.25 | 44022.5 | | 9707.5 |
| | | Gross | 757185 | 1246818 | 603828 | 757088 | 14402.07 | | 757185 |
| | | Net | 151437 | 249364 | 120766 | 151418 | 2791027 | | 151437 |
| Chevrolet | | Units | 86 | 85 | 11 | 54 | 228 | | 66 |
| | | Invoice | 7888 | 8211 | 12344 | 6675 | 36128 | | 7899 |
| | | Retail | 8873.75 | 11513.8 | 15430 | 8343.75 | 451612.3 | | 9873.75 |
| | | Gross | 651668 | 1093806 | 169730 | 450583 | 1E+07 | | 651666 |
| | | Net | 130334 | 218761 | 33846 | 80112.5 | 2041289 | | 130334 |
| Saab | | Units | 78 | 118 | 43 | 78 | 317 | | 78 |
| | | Invoice | 7766 | 8453 | 11234 | 7765 | 35218 | | 7766 |
| | | Retail | 9707.5 | 10566.3 | 14042.5 | 9706.25 | 44022.5 | | 9707.5 |
| | | Gross | 757185 | 1246818 | 603828 | 757088 | 1.4E+07 | | 757185 |
| | | Net | 151497 | 248964 | 120766 | 151418 | 2791027 | | 151437 |
| Make | Measurement | | | | | | | | Calc |

Exclusion clause added automatically based on user input, to resolve overlap
{ SKIP Retail: Total, Gross Total, Net: Total }

1. Retail = Invoice 1.25
2. Gross = Retail = Units
3. Net = (Retail = Invoice) Units
4. Total = Sum (Vehicle)

FIG. 5c

Car 2 Main

| Comp | Country | | | | | | | Year |
|---|---|---|---|---|---|---|---|---|
| Actual | Domestic | | | | | | | Vehicle |

| Make | Measurement | 1988 | | | | | 1987 | |
|---|---|---|---|---|---|---|---|---|
| | | Sports | Sedan | Van | Truck | Total | Sports | Sedan |
| Ford | Units | 819 | 123.9 | 45.15 | 81.8 | 332.85 | 78 | 118 |
| | Invoice | 7766 | 8453 | 11234 | 7765 | 35218 | 7766 | 8453 |
| | Retail | 8707.5 | 10566.9 | 14042.5 | 9706.25 | 44022.5 | 9707.5 | 10566.3 |
| | Gross | 785044 | 1309158 | 634018 | 794942 | 1.5E+07 | 757185 | 1246818 |
| | Net | 159009 | 261832 | 126804 | 158888 | 2830578 | 151437 | 249364 |
| Chevrolet | Units | 68.3 | 99.75 | 11.55 | 56.7 | 237.3 | 66 | 95 |
| | Invoice | 7899 | 9211 | 12344 | 6675 | 36129 | 7899 | 9211 |
| | Retail | 9873.75 | 11513.8 | 15430 | 8343.75 | 45161.3 | 9873.75 | 11513.8 |
| | Gross | 684251 | 1148487 | 178217 | 473091 | 1.1E+07 | 651668 | 1083808 |
| | Net | 136850 | 228688 | 35643.3 | 94618.1 | 2143353 | 130334 | 218761 |
| Saab | Units | 81.8 | 123.9 | 45.15 | 81.9 | 332.85 | 78 | 118 |
| | Invoice | 7766 | 8453 | 11234 | 7765 | 35218 | 7766 | 8453 |
| | Retail | 9707.5 | 10566.3 | 14042.5 | 9706.25 | 44022.5 | 8707.5 | 10566.3 |
| | Gross | 795044 | 1308158 | 634019 | 794942 | 1.5E+07 | 757185 | 1246818 |
| | Net | 159009 | 261832 | 128804 | 158988 | 2830578 | 151437 | 249364 |

Calc

1. Retail = Invoice 1.25
2. Gross = Retail Units
3. Net = (Rtail - Invoice) Units
4. Total = sum (Vehicle) SKIP Retail:Total, Gross:Total, 1988:Units:Total
5. Units:Year[THIS] = Units:Year[NEXT] 1.05

Recurrence Relationship in mathematical expression

FIG. 6

DATA PROCESSING APPARATUS AND METHOD FOR A REFORMATTABLE MULTIDIMENSIONAL SPREADSHEET

This is a continuation of application Ser. No. 07/580,320 filed on Sep. 10, 1990, now abandoned.

BACKGROUND OF THE INVENTION

In computer data processing, the term "spreadsheet" generally refers to a grid-like table or matrix for holding desired data. Typically, the grid-like table or matrix is formed of a series of columns intersecting a series of rows. The columns extend from a peripheral horizontal axis of the matrix while the rows extend from a peripheral vertical axis of the matrix. Each row is labelled with a numeral (1, 2, 3 . . . ) along the peripheral vertical axis and each column is labelled with a letter (A, B, C . . . ) along the peripheral horizontal axis. An intersection of a row and column forms a cell which receives a label formed by the composite of the respective labels of the row and column (e.g. C5). Each cell holds data according to a respective formula.

According to the foregoing grid structure, spreadsheets were referred to as two-dimensional, i.e. having two axes along which information could be located. More recently, a series of such spreadsheets have been used as a collection to provide a third dimension. Each spreadsheet in the series or collection is thought to extend from a position along a third axis. That is, the third axis provides a link from one spreadsheet to another in the series. Each spreadsheet in the series has the two axis format with numbered rows and lettered columns. And each cell has a composite label as described previously but with an additional indication of particular spreadsheet in the series of spreadsheets on which the cell is located. Additional dimensions provide links between different series of spreadsheets.

There are various disadvantages to such spreadsheets, both two-dimensional and multi-dimensional based on a series of spreadsheets. For the most part, labels of the spreadsheet are non-descriptive of the data being held by the spreadsheet. Further, the two axis format of the unit spreadsheet does not always present the stored data in a manner which is easy to read or of a desirable arrangement with respect to the reader. Both labelling scheme and display format of spreadsheets are static and unchangeable for different users' needs. Hence, current spreadsheets are too rigid and fixed in structure/format.

Another disadvantage is that only per cell formulas are employable in current spreadsheets. That is, cells are referenced by the fixed row/column labelling scheme. Hence, a degree of effort and care is required to maintain coordination between cells and respective cell formulas.

Accordingly, the need exists for a more flexibly structured spreadsheet such that one spreadsheet can satisfy needs of different users.

SUMMARY OF THE INVENTION

The present invention provides a spreadsheet which is more structurally flexible than spreadsheets of the prior art. In particular, the present invention spreadsheet employs a labelling scheme in which labels are user definable and user changeable, such that the labels are descriptive of data stored in the spreadsheet. The present invention spreadsheet also employs a non-fixed format which is user changeable to provide desired arrangements of stored data. Further, the present invention spreadsheet provides multi-dimensions in which data is stored and handled, where the dimensions greater than the second dimension are not necessarily based on a series of 2-D spreadsheets.

In a preferred embodiment of the present invention, data processing apparatus is employed in a computer system having a digital processor, input means to the digital processor and a display unit for displaying output from the digital processor. The data processing apparatus includes (a) a working screen view displayed on the display unit and (b) computer means including software and/or hardware. The working screen view provides a plurality of user definable icons (entities); each icon identifies a different dimension formed of a series of items. Each item is user definable. Each dimension is displayed along a horizontal axis, vertical axis or orthogonal axis in the screen view in accordance with position of the corresponding icon in the screen view. Position of the icons in the working screen view and, hence, axis along which dimensions are displayed are user changeable through the input means to the digital processor.

The computer means are responsive to positioning of the icons in the working screen view and preferably with respect to predefined areas in the working screen view. In particular, in response to a user positioning an icon in a first predefined area in the working screen view, the computer means forms from the series of items corresponding to the icon a horizontal axis in the working screen view. The different items in the series serve as different elements on the horizontal axis. In response to a user positioning an icon in a second predefined area in the working screen view, the computer means forms from the series of items corresponding to the icon a vertical axis in the working screen view. Each item in the series serves as a different element on the vertical axis. Elements along the horizontal axis define columns for holding user desired information corresponding to the element item and elements along the vertical axis define rows for holding user desired information corresponding to the element item. The rows and columns are substantially orthogonal to each other and intersect each other. Each intersection between a row and a column form an area for holding user desired information corresponding to both the element item defining the row and the element item defining the column.

In response to user positioning a desired icon in a third predefined area in the working screen view, the computer means forms from a series of items corresponding to the desired icon an orthogonal axis in the working screen view. That is a third axis which is orthogonal to the vertical and horizontal axis is formed. Each item of the series of the desired icon serves as a different element on the orthogonal axis. Each element on the orthogonal axis provides a matrix of intersections of rows and columns. Each matrix has one or more horizontal axes formed of a series of items corresponding to icons positioned in the first predefined area in the working screen view. The different items serve as different elements on the horizontal axes and define columns of the matrix. And each matrix has one or more vertical axes formed of a series of items corresponding to other icons positioned in the second predefined area in the working screen view. Different items serve as different elements along the vertical axes and define rows of the matrix. Each matrix holds user desired information corresponding to the desired icon item which defines the orthogonal axis element that provides the matrix.

In accordance with one aspect of the present invention, more than one icon may be positioned in the predefined areas of the working screen view. In a case where more than one icon is positioned in a predefined area of the working screen view, a sequence of icons is established. In response, the computer means forms from the series of items corresponding to a first of such icons a respective axis. Each item in the series is a different element on the axis. And the computer means forms a related axis for each of said other icons in the sequence. Each related axis has elements defined by the series of items corresponding to a respective icon. For each element on an axis formed from a series of items of a previous icon in the established sequence, the computer means forms from series of items corresponding to a succeeding icon a sub-axis. Each item in the series of items corresponding to the succeeding icon serves as a different element on the sub-axis.

Further, the computer means is responsive to a user swapping position of adjacent icons. That is, items of a dimension of one icon provide a set of subdivision items for each item in a dimension of another icon adjacent the one icon. The computer means responds to swapping of positions of the one and adjacent icon by subdividing each item in the dimension of the one icon by the items of the dimension of the other icon.

In accordance with another aspect of the present invention, selection means enable a user to select a whole row, a whole column, or portions thereof according to corresponding item. Also, each of plural icons identifying respective dimensions along the orthogonal axis is user selectable. In response to such a selection, the computer means enables display of a succession of matrices corresponding to the items of the selected dimension/icon. One matrix at a time is displayed upon user command, preferably through graphical elements displayed in the working screen view. During display of the matrix corresponding to the last item of the dimension, the graphical elements provide an indication that the matrix is the last displayable matrix in the succession of matrices. The screen view further includes an indication of position of the item corresponding to a displayed matrix relative to a last item in the dimension.

Also included are means (e.g. graphics and user-interfacing) for forming new icons identifying new dimensions and means for adding new items to dimensions displayed in the working screen view. One such means for adding new items is a dispenser icon which generates series of new items. In particular, predetermined series of numbers, letters, combinations thereof, years, quarters, weekdays and months are generated.

In addition, the working screen view includes a calculation portion separate from the area covered by displayed axes. The calculation portion provides a plurality of user established mathematical expressions relating information of different items of displayed dimensions. The computer means responds to user changing of an item in the axes portion of the screen view by accordingly changing references to the item in mathematical expressions. The mathematical expressions reference information of different items according to indications of the respective items as displayed along axes of the working screen view. In contrast, prior art spreadsheet systems referenced information of different items according to cell name, e.g. C5, A3, etc. To that end, the present invention references desired information with descriptive item names/indications that are usually indicative of the item information and readily meaningful to the user.

Also, the mathematical expressions include generalized relationships which involve information of the various items of a dimension. In response to addition of new items to the dimension, the computer means applies the generalized relationships to the information of the new items.

The mathematical expressions also may employ a restriction clause and an exclusion clause. In response to a term with the restriction clause, the computer means applies a mathematical expression only to the information of certain items. In response to a term with the exclusion clause, the computer means applies the mathematical expression to information of all except certain items.

The data processing apparatus of the present invention also employs error checking means. Error messages generated by the error checking means are displayable in the calculation portion of the screen view to indicate errors in the mathematical expressions. Solution means further indicate solutions to the noted errors which involve overlap of mathematical expressions. Upon user selection of one of the indicated solutions, the solution means corrects the mathematical expressions accordingly. In a preferred embodiment, in the calculation portion of the working screen view, for each mathematical expression there is an indicator for indicating whether any conflict exists in the mathematical expression.

Also, the mathematical expressions may include dimension based expressions which define data of one item of a displayed dimension from data of other items of the dimension. Each item in the expression is indicated with respect to relative position in the dimension. This provides recurrence relationships between the items of a dimension.

Further, The mathematical expressions may include user defined group names. Each group name indicates a set of user selected items of a dimension. The computer means is responsive to a group name in a mathematical expression by applying the expression to information of each item in the set of items corresponding to the group name.

Additional processing means generate a user desired relationship among information of items corresponding to a group name. The computer means is responsive to the processing means by forming a summary item corresponding to the generated relationship and by displaying an indication of the summary item in the working screen view. Preferably, the indication is displayed in the dimension of the set of items corresponding to the group name. Examples of generated relationships include averages, totals, minimum, maximum, a count and standard deviation of group item information.

The computer means enables display of the working screen view to be toggled between (a) the screen view with the dimension including the set of group items and the summary item and (b) the screen view with the dimension formed of the summary item in place of the set of group items. Also, the group name may be displayed adjacent the dimension of the corresponding group items. Further, the computer means is responsive to use of the group name to indicate the set of items corresponding thereto.

To accomplish the foregoing, the computer means includes a cell module, a symbol table and a display defining module. The cell module stores in respective memory cells user desired information for each item of the different dimensions in the working screen view. The symbol table translates between current user specified names of items in the working screen view and indexes to the respective memory cells of the cell module. This allows users to change names of items and icons in the working screen view without the computer means losing information associated with the items whose names are changed.

The display defining module defines a screen view in response to user positioning of icons with respect to the predefined areas in the working screen view. Specifically, the display defining module obtains through the symbol table indications of elements from the user specified items in the working screen view and from the symbol table indications obtains through the cell module the associated user desired information. As users rearrange items and/or icons in the working screen view, the display defining module allows such positional rearranging while maintaining association between intersections of rows and columns and the user desired information held in those intersections.

To that end, a spreadsheet displayed in a working screen view may be reformatted by a user rearranging the icons with respect to the predefined areas of the working screen view without losing information held in the various cells of the spreadsheet.

In a preferred embodiment, up to 12 dimensions and, hence, axes including sub-axes may be employed in a spreadsheet of the present invention.

As used herein the term "icon" includes labels that are user renameable and moveable, and entities that are user renameable and locationally moveable within the four corners of the displayed screen view.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1b is an overview of spreadsheet organization supported by the embodiment of FIG. 1a.

FIGS. 2a-6 are screen views of a spreadsheet supported in different ways by the present invention.

DETAILED DESCRIPTION OF THE PREFERRED EMBODIMENT

The present invention enables the reformatting or rearranging of information including axis (dimension) labels, items of a dimension and data of a spreadsheet as desired by a user. Further, the present invention enables the creation of multi-dimensional spreadsheets wherein calculations are specified through general, rather than per cell, formulas.

Figure 1A:
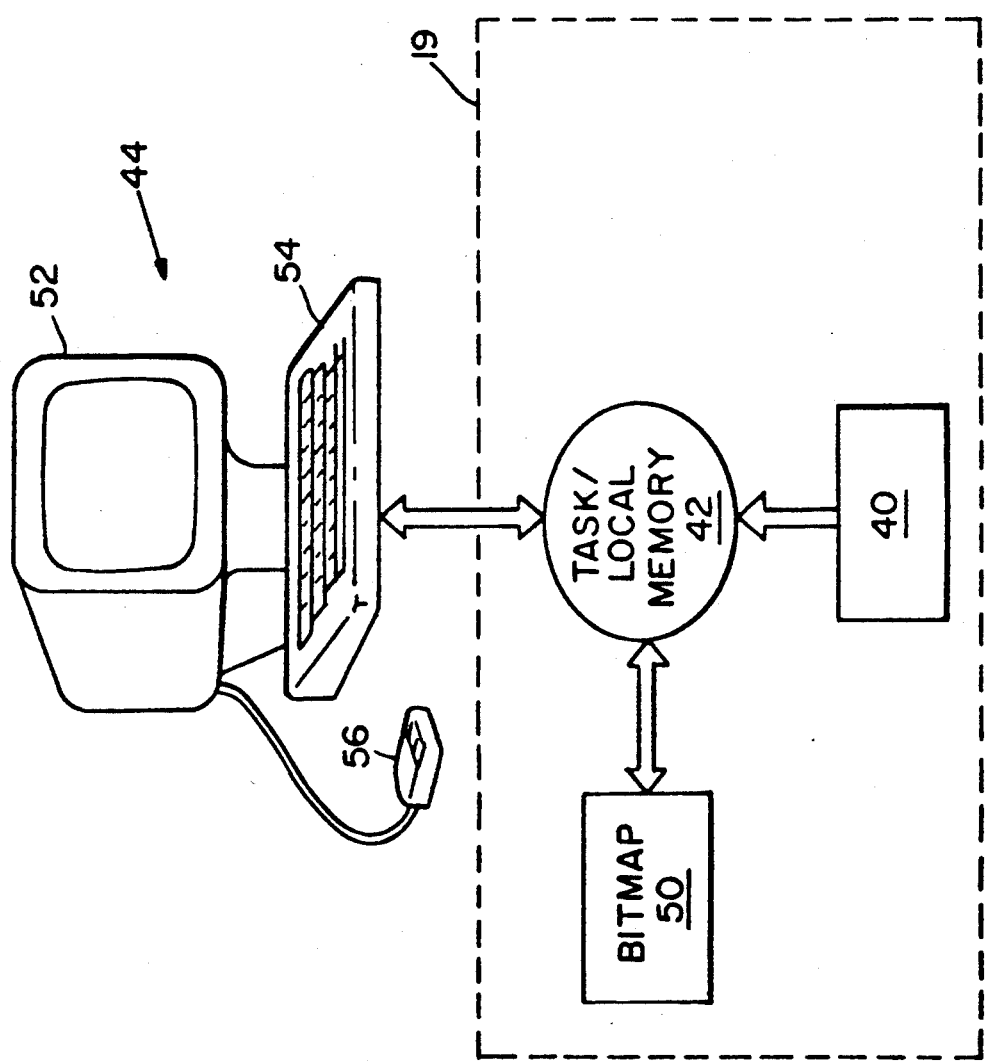
FIG. 1a is a schematic diagram of one embodiment of the present invention.

In general, the present invention is implemented in software and executed on a digital processor, either in an interactive task 42 (FIG. 1a) of a multi-task processor or in local memory 42 (FIG. 1a) of a PC. FIG. 1a is illustrative of such a digital processing system. Coupled to the digital processor 19 for interactive execution of the invention software program 40 is a workstation terminal 44 including a display unit 52, keyboard 54 and other I/O devices as are common in the art.

The following provides non-limiting illustrations of display unit screen views and user interface therewith employed by the present invention. It is understood that other screen view layouts and user interfaces are similarly suitable for use in the present invention.

User Interface

The preferred embodiment of the present invention utilizes a graphical user interface employing windows in a bitmap 50 (FIG. 1a) display, and a mouse input device 56 (FIG. 1a). The following standard kinds of facilities are employed throughout the discussion of the preferred embodiment of the invention:

Selecting—by positioning the screen cursor on a desired object and clicking (depressing a button of) the mouse 56 or operating other input means, the desired object such as an icon or other component of the interface is identified or selected. Subsequent commands often operate on the selected entity.

Dragging—by positioning the screen cursor on a desired object and clicking with the mouse 56 (i.e. depressing a mouse button), holding the mouse button down and moving the mouse 56 to move the screen cursor to another location, the desired object (e.g. an icon or other component of the interface) is moved from one location to another, often with an additional effect.

Double clicking—by clicking twice in rapid succession while the screen cursor is positioned on an icon or other component of the interface, a predetermined operation on that element is executed.

Scrolling—by operating (clicking, double clicking, dragging) a scroll bar entity in the user interface, the display in a window can be made to scroll and thus, permit a very large object to be viewed in parts in a small window on the display unit screen.

Inputting data—by selecting a menu option or an area designated to receive user input, and typing on the keyboard, the desired data is input to the displayed screen view.

Multidimensional Spreadsheet Model

Figure 1B:
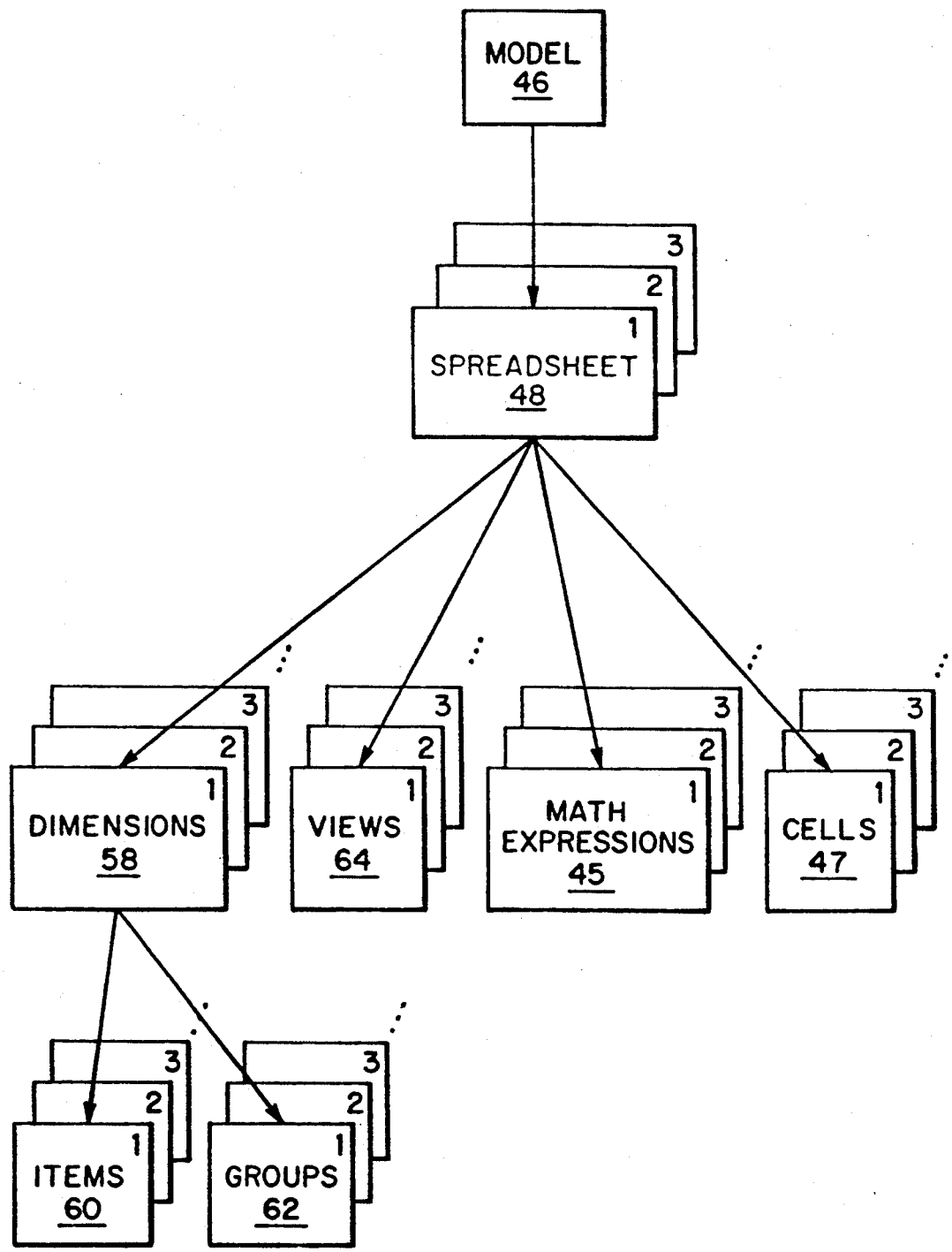
Figure 2C:
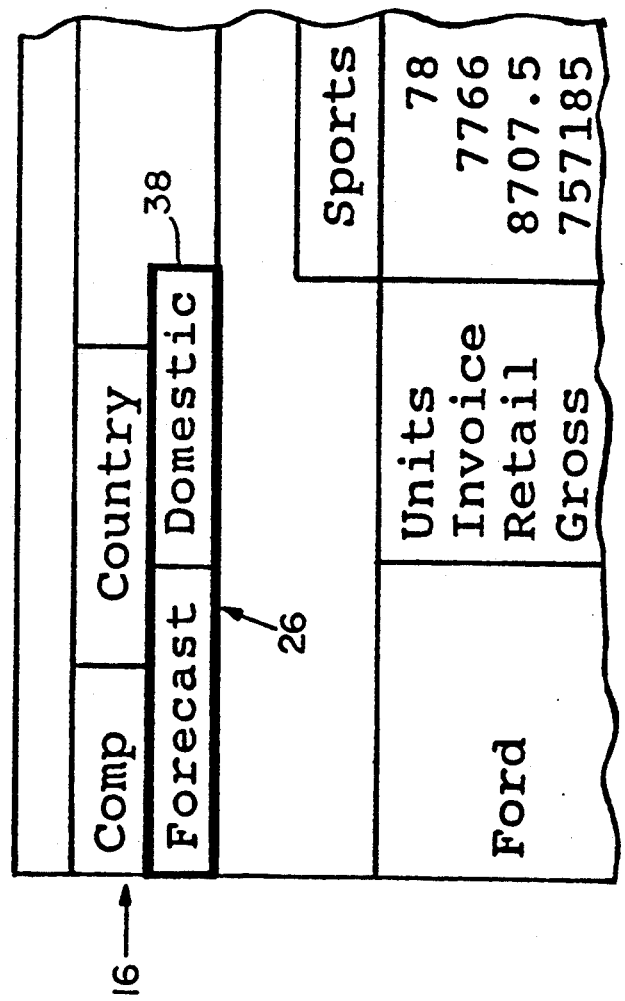

The present invention allows the definition of multi-dimensional spreadsheet models with the following properties and capabilities. FIG. 1b illustrates the organization of the different parts described next.

Models—a model 46 contains a plurality of spreadsheets 48 all stored under one file name by the processor 19.

Spreadsheet—a spreadsheet 48 contains a plurality of dimensions 58, formulas or mathematical expressions 45, cells 47, and views 64, as defined below. The terms "worksheet" and "spreadsheet" are synonymous and are used herein interchangeably.

Dimensions—a spreadsheet 48 contains a plurality of dimensions 58. Each dimension 58 is named with a default name being supplied by the supporting software program 40 (FIG. 1a) and the user being able to rename the dimensions at will through the input devices 54, 56. Each dimension 58 consists of a plurality of items 60. In a preferred embodiment, for each dimension 58 there is an icon or other displayed entity bearing the dimension name or other identification of the dimension.

A typical user interface with the mouse 56 and keyboard 54 to label the icon and thus, name/rename the corresponding dimension 58 includes (a) operating the mouse 56 to position the screen cursor on the desired icon, (b) activating a switch of the mouse 56 to select the icon to which the cursor currently points, and (c) typing on the keyboard 54 a desired word or phrase to input the same for the name of the icon. Other user interfaces to accomplish the inputting of a desired label to name/rename dimensions 58 are suitable.

Further, dimensions 58 can be created, deleted and rearranged as the user requires at any point in time. In the preferred embodiment, the creation of a dimension 58 involves creating an icon for the dimension in a pre-defined area (discussed later) of the spreadsheet 48. In other embodiments, creation of a dimension 58 may be a two step process of obtaining a new icon for the dimension and user positioning the icon accordingly in the spreadsheet 48. In any case, graphical means such as a menu or generation icon and user-interface therewith are employed to obtain user selection of one or more desired new icons. In response to operation of the graphical means, the invention software 40 generates and displays new icons accordingly.

The positioning/repositioning of dimension icons is accomplished by the dragging facility of the user-interface described previously and is with respect to predefined areas of the screen view discussed later. Upon a dimension icon being positioned in one of the predefined areas, the invention software 40 displays a corresponding dimension 58 in the spreadsheet 48.

Items—an item 60 is a coordinate along a dimension 58. Every item 60 belongs specifically to one dimension 58 and is named with a default being supplied by the supporting software program 40. To that end, in a spreadsheet 48, each item 60 serves as a header to a row, column or matrix of data extending from the corresponding dimension 58. The user is able to rename an item 60 at will through the input devices 54, 56.

Further, items 60 can be created and deleted through pertinent graphics and user interface therewith as the user requires at any point in time. In a preferred embodiment, predetermined series such as months, weekdays, integers, years and quarters, letters of the alphabet, and names incorporating a successively increasing integer may be generated for the items of an existing dimension. The software 40 is also sensitive to user specification of capitalization and/or abbreviation of the names of months and weekdays. Common programming techniques are employed to provide these features of the present invention.

Groups—a group 62 is subset of a dimension 58, defined by a beginning and ending item 60. Each group 62 belongs to a dimension 58 and is named with a default being supplied and the user being able to rename the group at will. Groups 62 can be created and deleted as the user requires at any point in time. Preferably, a group 62 can contain between one and eight thousand items 60. Groups 62 can also contain other groups 62.

Cells—a cell 47 is the storage place for a unit of information and is graphically formed by the intersection of a row and column in a matrix of a spreadsheet 48. Each cell 47 contains either a real number, the values "NA" or "ERROR", or alphanumeric text, and in addition various formatting information. Each cell 47 is identified by a cell name defined as a collection of item names, one from each dimension 58 currently existing in the spreadsheet 48. Cells 47 are automatically created by the software program 40 whenever items 60 are added to a dimension 58 so that there are always exactly as many cells 47 as the product of the number of items in each dimension. The particular value stored in a cell 47 can either be specifically supplied by the user or computed as directed by user supplied mathematical expressions 45.

Mathematical expressions—the present invention provides for the user to supply mathematical expressions 45 for controlling the calculation of cell values from other cell values.

Screen Views

The present invention provides for the display of spreadsheets 48 (FIG. 1b) on the computer display unit 52 (FIG. 1a) in various screen views. FIGS. 2a–6 illustrate the general layout of the display. In general, each viewed display or screen view corresponds to a specific spreadsheet 48, and consists of two re-sizable areas, one (an upper window) 18 to display the dimensions 58, items 60, groups 62 and cells 47, and the other area (lower window) 36 to display the mathematical expressions 45 employed for computing cell data in the spreadsheet 48. The size of the two areas 18, 36 and the proportions used for each area are under user control through displayed moveable icons, arrow icons, elevator bars and the like common in the art with the user interface described above. In one example, a moveable sizing icon enables the user to size areas 18, 36 such that only one window is displayed.

The upper window area 18 displaying the dimensions, items, groups and cells is organized as follows. There are three distinct sub-areas for the display of dimension icons 12. These sub-areas are referred to as row, column and page dimension areas at 32, 34, 16 respectively. Also, there are three distinct sub-areas (axis areas) for the display of items. These sub-areas are referred to as the row, column and page item areas 10, 14, 26. The row item area 10 corresponds to the row dimension area 32; the column item area 14 corresponds to the column dimension area 34; and the page item area 26 corresponds to the page dimension area 16. A central area is provided for the display of cells and is called the cell area 20.

Within the dimension areas 32, 34 and 16, dimension icons 12 which contain respective dimension names, of some particular spreadsheet 48 are displayed on the display unit 52 screen. As illustrated in FIG. 2a, some of the dimension icons 12 appear in the row dimension area 32, some others in the column dimension area 34, and the rest in the page dimension area 16. The allocation of dimension icons 12 to these areas 32, 34, 16 is controlled by the user, typically through the dragging facility of the user interface with the mouse 56 (FIG. 1a).

Each dimension area 32, 34, 16 has room for a plurality of dimension icons 12, in any particular instance one or two, but not all three, of the dimension areas 32, 34, 16 can be unoccupied by dimension icons 12. FIG. 2b illustrates page dimension area 16 unoccupied by dimension icons 12 and "Country" dimension icon 12f positioned in the row dimension area 32. When only one dimension icon 12 is located within a certain dimension area 32, 34, 16, all the item names contained in the corresponding dimension are displayed (e.g. along an axis) in the corresponding item area, either row, column or page item area 10, 14, 16. Or as many as may fit will be displayed based on the size of the displayed corresponding area 10, 14, 26. If there is insufficient room to display as many items as exist in the dimension, then scrolling 38 or similar means are provided for cycling through the items, so that in effect all of them can be made visible under user control.

In a preferred embodiment, item names corresponding to a dimension icon 12 positioned in the row or column dimension area 32, 34 are displayed along vertical or horizontal axes respectively in the row or column item areas 10, 14. Item names corresponding to a dimension icon 12 positioned in the page dimension area 16 are displayed one at a time in the page item area 26. For each page item, the cell area 20 is displayed with a matrix of cells formed by the axes of items of dimension icons 12 in the row and column dimension areas 32, 34.

Also, graphical elements are displayed and user operated through the user interface with input devices 54, 56 to cycle through the page items of a corresponding dimension icon 12 positioned in the page dimension area 16. Alternatively to cycling through the page items, the invention software 40 provides successive views one at a time to a last view which corresponds to the last page item in the corresponding dimension. Graphical indications, such as a successively decreasing number of displayed overlapping page portions 38 (FIG. 2c) are provided with the display of the succession of views to indicate position in the succession (series of page items) with respect to the last view (page item). Page Indicator 38 of FIG. 2c indicates that the current view is the penultimate item corresponding to a penultimate item in the succession of views/page items of the dimension "Country".

Common programming procedures and methods are utilized to provide the foregoing features of the cycling or successive to a last view display of a spreadsheet page dimension.

When more than one dimension icon 12 is located by the user in a dimension area 32, 34, 16, then the dimension area and the corresponding item area 10, 14, 26 are subdivided, working from left to right in the case of the row and page areas and from top to bottom in the case of the column areas. That is, there is a hierarchy among dimension icons 12 located in the same dimension area 32, 34, 16, and there is a corresponding hierarchy of the series of items corresponding to the dimension icons 12. To that end, one series of items forms an axis and another series of items forms sub-axes to the axis in the corresponding item area 10, 14, 26.

Said another way, all items from each dimension corresponding to the dimension icons 12 occurring in the dimension areas 32, 34, 16 are displayed in the corresponding item areas 10, 14, 26, in such a way that all combination of items in those dimensions are displayed. This is achieved by including a complete set of items from one dimension next to each instance of an item in the dimension corresponding to the icon to the left (or above in the case of the column dimension area 34) of the one dimension icon.

For example in FIG. 3a, dimension icons 12a, 12b "make" and "measure" occur from left to right in the row dimension area 32. Names of items of the more significant "make" dimension icon 12a occur along a first vertical (left most) axis in the row item area 10. Names of items of the less significant "measure" dimension icon 12b repeatedly occur along sub-axes 22 of the left most vertical axis in the row item area 10. Thus, the item names of the second dimension icon subdivide each item named for the first dimension icon in row dimension area 32.

Likewise in the column dimension area 34, dimension icons 12c, 12d "year" and "vehicle" occur from top to bottom and respectively correspond to a first horizontal axis and sub-axes 24 in the column item area 14. Hence, names of items of the more significant "year" dimension icon 12c define elements along the first horizontal axis in the column item area 14. And names of items of the less significant "vehicle" dimension icon 12d repeatedly occur along sub-axes 24 of the first horizontal axis in the column item area 14. These item names ("sports", "sedan", "van", "truck") subdivide each item (1988, 1987 ...) of the first horizontal axis (i.e. the "year" dimension) in the column item area 14.

It is understood that further levels of sub-axes (i.e. sub-axes of a sub-axis) are possible in the same manner as described above for each of the row, column and page item areas 10, 14, 26. Preferably the present invention enables up to twelve dimensions or axes including sub-axes.

The cell area 20, displayed to the right of the row item area 10 and below the column area 14, includes an intersection point corresponding exactly to a cell as described above, wherein the cell value is displayed. The particular location of a cell in a spreadsheet is dependent on the particular arrangement of dimension icons 12 in dimension areas 32, 34, 16, and as a result can be made to change whenever the arrangement of dimension icons 12 changes. Further the cell is referenced by a composite name formed of item/subitem names, in any order, of the items/subitems heading the row, column and matrix corresponding to the cell intersection point.

For example, the cell 47a defined by the intersection of column item/subitem ∫ 1987 sports" and row item/-subitem "Saab Net" hold the value 151437 in FIG. 3a and is referenced as "1987:Sports:Saab:Net:Actual:Domenstic". In FIG. 3d, the dimension icons 12a, 12b "make" and "measure" have swapped positions from that of FIG. 3a. And hence, cell 47a is displayed in a different location on the screen but is referenced as "1987:Sports:Net:Saab:Actual:Domestic" or "1987:Sports:Saab:Net:Actual:Domestic" or any other arrangement of item/subitem names "1987", "Sports", "Net", "Saab", "Domestic" and "Actual". To that end, data values in a cell are correlated to meaningfully named items along the column, row and page item areas 14, 10, 26 for each arrangement of dimension icons 12 as discussed in more detail later.

Whenever a dimension contains one or more groups 62 of items, the corresponding item area 10, 14, 26 is further subdivided to accommodate the display of items according to group 62. FIG. 3b illustrates the display of group name "U.S. Made" adjacent the corresponding items of the group 62a (i.e. "Ford", "Chevrolet", and a summary item 59a "Total" discussed later). And group name "Non U.S. Made" is displayed adjacent its group 62b items "SAAB", "BMW" and summary item 59b "Total". Note that dimension icon 12b "measure" is positioned in the page dimension area 16 in FIG. 3b (instead of the row dimension area 32 like in FIG. 3a) to better illustrate that groups 62 "U.S. Made" and "Non U.S. Made" are part of the same dimension "make" in row item area 10. However, the dimension icons 12 and, hence, corresponding dimensions may be arranged as desired with or without the desired groups 62 as illustrated in FIG. 3e and discussed next.

Through the input means 54, 56, the user moves dimension icons 12 from one place in one dimension area 32, 34, 16 to another place in the same or different dimension areas. The invention software 40 responds by reformatting the display, the dimension areas 32, 34, 16, item areas 10, 14, 26, and cell area 20 accordingly. In addition, the invention software 40 allows user designation and selection of a dimension item, subset of items, subset of cells, groups or formulas, so that subsequent commands to the computer operates only on the designated portions of the spreadsheet. Such designation and selection is performed through the user interface (discussed above) with common graphical aids (e.g. menus, selection, elements, etc.) displayed in the screen view.

Also, interactive means known in the art are provided for controlling the format, column widths, color, font, style, size, shading, row heights of all the elements in the display.

Further, using the input means 54, 56 and menus or other displayed graphics, the user can elect and re-elect that certain items not be displayed (hidden) or that only a summary value be displayed in the place of a collection of items of a dimension. To accomplish this, the software program 40 enables a user to create a summary item 59 (FIG. 3b) within a group 62. When a summary item 59 is created, it is specified to compute a user entered mathematical relationship between items of a group 62 or to automatically compute a total, average, minimum, maximum, standard deviation or count of the items of the subject group 62. General mathematics are employed to implement the computation using values of all the items in the group 62.

Groups that contain summary items 59 can be displayed in two modes under user control: "expanded" or "collapsed" as illustrated in FIGS. 3b and 3c. The "expanded" mode is the normal display 64a of the group 62 and provides all the items in the group 62 including the summary item as shown in FIG. 3b. The "collapsed mode" displays only the summary item 59 of the group 62 as shown in the screen view 64b of FIG. 3c. Pertinent graphics and user interface techniques are employed to enable the user to toggle between screen views 64a and 64b of FIGS. 3b and 3c respectively.

To that end, a plurality of arrangements of a spreadsheet according to the preceding capabilities, (i.e. placement of dimension icons in dimension areas, formatting information, width and height information, colors, etc.) can be produced and saved by the processor 19 under user specified names so that any one arrangement can be recalled by user command.

Mathematical Expressions

The present invention provides for the specification of mathematical expressions for the computation of additional data from input data. That is, each spreadsheet 48 of a model 46 (FIG. 1b) may include a plurality of mathematical expressions 45 computing values in that spreadsheet from other values in the same or other spreadsheets of the model. As shown in FIG. 4a, each mathematical expression 45 expresses (i) a computational formula to apply to a collection of input cells (the input or right-hand side 28 of the mathematical expressions 45), and (ii) a collection of output cells (the output or left-hand side 30) in which the result of the computation will be stored. When the user enters expression 45 into the processor 19 during interactive execution of the invention software 40, the expression 45 is verified for validity. An error message is presented to the user if the expression 45 is found to be invalid as discussed below. The error is further recorded for the user by means of an error icon 66 displayed to the left of the math expression 45 in the spreadsheet screen view as shown in FIG. 5a. Display techniques common in the art are utilized to provide error icon 66.

Specifically, in the mathematical expressions 45, the cells 47 are denoted using the names of items 60, groups 62 and dimensions 58 as described above. In particular, a reference notation which allows any arbitrary set of the cells 47 in a particular spreadsheet 48 to be noted is employed. This reference notation is simply a delimited list of names with at most one name from each dimension 58. Where a dimension is omitted from a reference, the mathematical expression 45 is interpreted to mean all items 60 in that dimension 58. Where a group name is included in such a reference, it is interpreted to mean all the items 60 in the group 62. In this way, the notation permits an arbitrary multi-dimensional subset of the multi-dimensional spreadsheet 58 to be denoted.

For example, item name "Saab" in a mathematical expression 45 denotes cells within the circled area 21 of FIG. 4a; and group name "U.S. Made" (FIG. 3b) in a mathematical expression 45 denotes group 62a items "Ford", "Chevrolet" and "Total" 59a (FIG. 3b) and all cells pertaining thereto. And shown in FIG. 4a "Actual:domestic:1987:Sports:Saab:net" in a mathematical expression 45 denotes cell 47a while "1987:Sports:Saab:Net" denotes a cell at 47a in each view (page) in the succession of views corresponding to the "comp" and "country" page dimensions.

The input side 28 of the mathematical expression 45 denotes a computation by combining numeric values, textual values, reference notations, and mathematical operators and functions. The result of such a computation produces a multi-dimensional collection of results. This collection of results is then stored into the multi-dimensional collection of cells denoted by the output side 30 of the mathematical expression 45. If the dimensionality or size of the input and output sides 28, 30 of the mathematical expression 45 cannot be fully reconciled, some subset of either the input or output side 28, 30 of the expression is ignored.

In addition to the input and output sides 28, 30 of the mathematical expression 45 described above, mathematical expressions can also contain additional clauses which limit the expression's application. In particular, one clause specifies a restriction such that the expression applies only to a certain area of the multi-dimensional spreadsheet. Another clause specifies an exclusion such that the expression applies everywhere except a certain area of the multi-dimensional spreadsheet. In the preferred embodiment, the clauses "IN" and "SKIP" provide the foregoing limitations for math expressions as illustrated in FIGS. 4b and 5c. Math Expression 45a in FIG. 4b computes "vehicle total" only in cells of "1987:Units". Math Expression 45b in FIG. 5c computes "total" from the sum of values of all the elements in the "vehicle" dimension (dimension icon 12d), but does not compute the total for items "retail", "gross", and "net" in the "measure" dimension corresponding to dimension icon 12b.

Figure 5B:
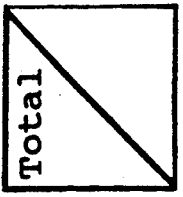

Because multiple mathematical expressions 45 can be specified within one spreadsheet 48, it can happen that two or more expressions 45 compute results to be stored in the same cell 47. This eventuality is automatically detected and prevented by the invention software 40. The competing mathematical expressions 45 and the cells 47 in question are flagged with an error message or general indication displayed in the screen view as illustrated at 65 and 66 in FIG. 5a. Graphics means 68 (FIG. 5b) together with the user interface is provided for the user to indicate which mathematical expression is intended for the cell or cells 47 in question. Preferably, graphics means 68 is displayed upon user request from the current screen view and prompts the user to input a resolution or to select a processor provided resolution. As a result of the user provided input/indication one or more mathematical expressions 45 are modified by the invention software 40 so as to correct the problem. FIG. 5c illustrates the math expression 45b of FIG. 5a modified by software 40 according to user preference as indicated through graphics 68 of FIG. 5b. Math expression 45b in FIG. 5c now includes an exclusion ("SKIP") clause to resolve the overlap of math expressions 45 detected in FIG. 5a.

Whenever any user entered mathematical expression 45 is verified to be error free, the results computed by that expression are immediately displayed in the result (output) cells 47. Whenever any of the input cells 47 change value for any reason, for example data entry by the user or the calculations of other mathematical expressions 45, all and only the relevant mathematical expressions 45 are recomputed and the results displayed in the resultant cells 47.

A special variant mathematical expression 45 exists for computing recurrence relationships where the value of one item 60 of a dimension 58 is computed from the value of a preceding or following item in the same dimension 58 in an automatically cascading calculation. One example of a recurrence relationship is the units of this year being computed from the units of the preceding year plus five percent. In the preferred embodiment, a special notation is employed to specify the relationships from one item to the next as illustrated at 45c in FIG. 6. In that mathematical expression 45c, the units item is computed differently in each item of the "year" dimension. Namely, the units in any particular item in the "year" dimension is computed by multiplying the units in the following item in the "year" dimension by 1.05. The terms permitted between the square brackets for providing a recurrence relationship include "THIS", "PREV", "NEXT", "FIRST", "LAST" alone or in combination with an integer (e.g. "THIS-2" or "FIRST+3").

As the spreadsheet structure is modified by the addition or deletion of items 60, groups 62, or dimensions 58, mathematical expressions 45 are continually updated and recomputed. In particular, the math expressions 45 are updated for consistent display with the item names and dimension names displayed in upper window 18 of the spreadsheet. And the math expressions 45 are re-computed so that new cells which are created and which are members of one or more formulas output side 30 are filled with results with no intervention of the user. Software 40 provides this updating and recomputing as discussed below.

Details of the Implementation

Figure 7:
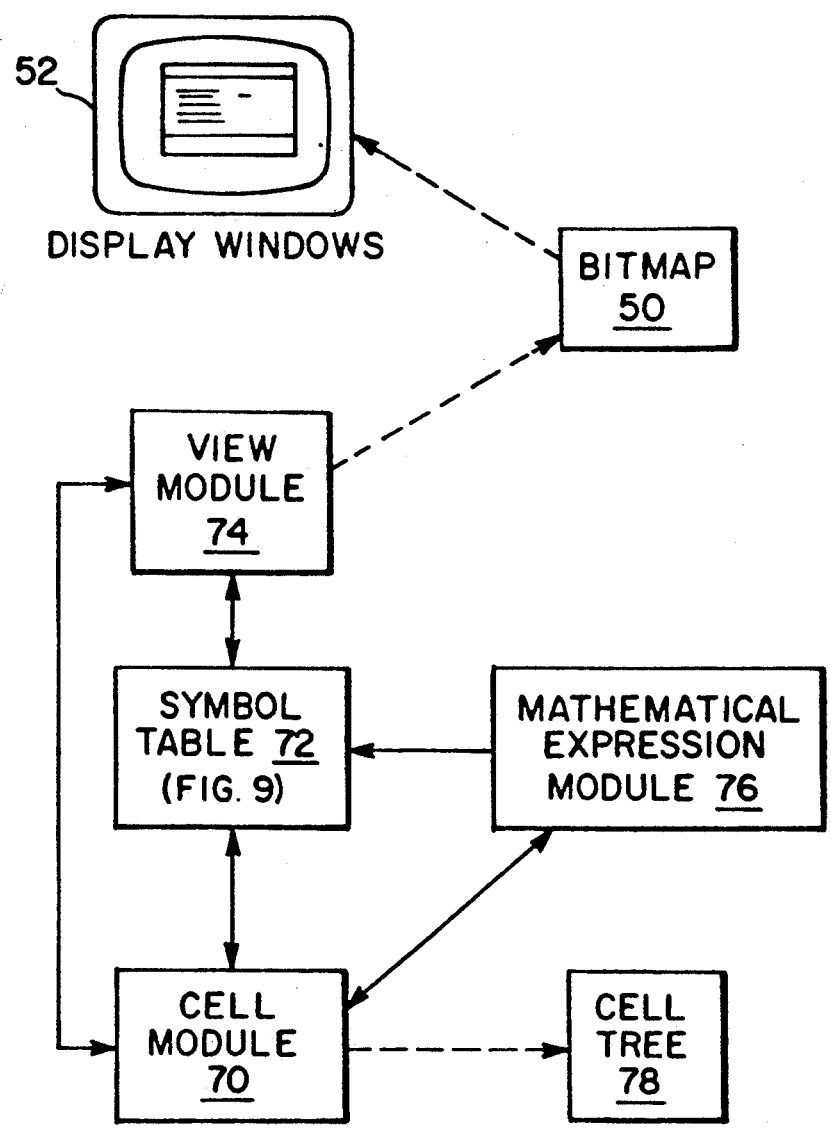
FIG. 7 is a block diagram of the supporting software program of the present invention.

The following section discusses the internal implementation of the present invention spreadsheet apparatus. For the purposes of this exposition, we divide up the invention software 40 into these key components as illustrated in FIG. 7.

A Cell module 70 providing a primitive multi-dimensional data structure, mapping multi-dimensional coordinates into cell structures in memory and providing a primitive mathematical capability where a mathematical expression 45 for a single cell 47 at a time can be controlled.

A Symbol table 72 providing the mapping of item 60, group 62, dimension 58, spreadsheet 48, and model names to the corresponding primitive mechanisms provided by the cell module 70.

A view module 74 implementing the display of the views on the display unit 52 screen, and using the preceding two modules 70, 72 displays the contents of the spreadsheet on the display unit screen, as well as providing the support for all the operations and user interface provided by the view display previously described.

A Mathematical expression module 76 for providing the analysis of mathematical expressions 45 provided by the user, the creation of the primitive mathematical expressions implemented by the cell module 70, and the various mechanisms to automatically update mathematical expression 45 as other elements in the models 46 and spreadsheets 48 are modified by the user.

Cell Module

This major module 70 implements an integrated collection of services to the other major components of the invention. The following describes the major subcomponents, interfaces and data-structures of the cell module 70.

Figure 8A:
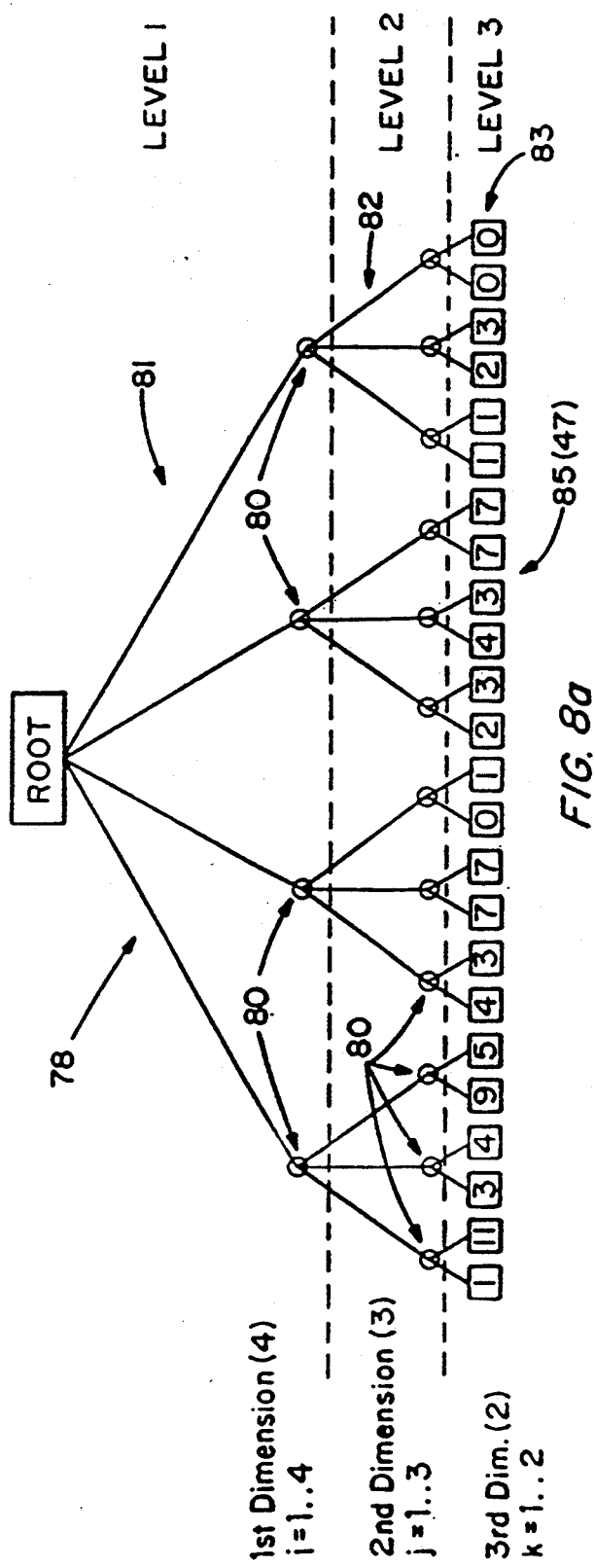
FIG. 8 is a schematic view of a cell module data structure employed in the software program of FIG. 7.
Figure 8B:
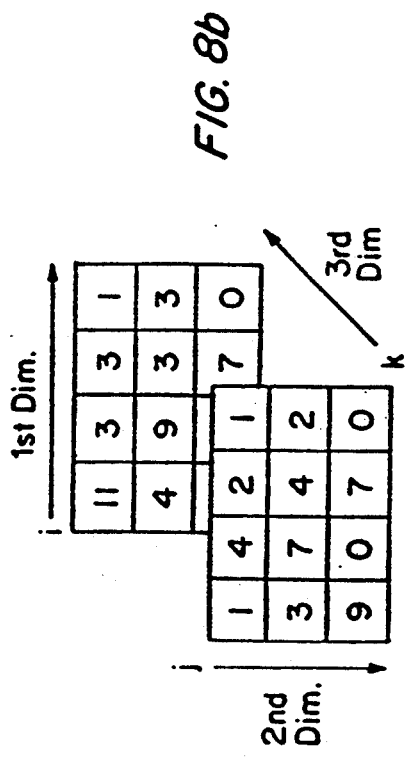

At the heart of the cell module 70 is the cell tree data-structure 78 shown in FIG. 8. Tree Structure 78 stores the cells 47 of a certain spreadsheet 48 as a tree data structure, with as many levels as there are dimensions 58 in the spreadsheet 48. The dimensions are numbered 1st, 2nd, etc. in FIG. 8 and respectively map to the first, second, etc. levels 81, 82, 83 under the root of the tree. At each level 81, 82, 83 of the tree, there are a plurality of nodes 80, one node for each element in the corresponding dimension 58. Each node 80 may have as many descendants (branches leading from the node to the next level) as there are elements in the next dimension 58. The nodes 80 of the last level 83 of the tree are the leaves 85 of the tree. The leaves 85 of the tree are the actual cells 47 of the spreadsheet 48 in question.

As stored in the leaves 85 of the tree 78, contents of a cell 47 may include a double precision value or a text string value. In addition, a cell 47 may contain an arbitrary set of cell properties, including notably a primitive mathematical expression to compute a value in the cell based on values in any other cells 47, or constants, and including operators and mathematical expressions. Note that this primitive notation is a subset of the mathematical expression notation the user enters. The mathematical expression module 76 provides the mapping between the user notation and the primitive notation as discussed later.

The cell module 70 provides a set of access routines which permit the tree 78 to be accessed as a "sparse multi-dimensional array of cells". To access any cell 47 (leaf 85) in this cell tree 78, a set of indexes which follows branches from the root through the different levels to the desired cell is needed. In particular as illustrated in FIG. 8, a set formed of one index along each dimension (level 81, 82, 83) is employed and denoted [i,j,k . . .] where i is the number index of the element in dimension 1 from which the desired cell depends, j is the number index of the element in dimension 2 from which the desired cell depends, k is the number index of the element in dimension 3 from which the desired cell depends, and so forth. Further, it is understood that i can take on the value 1 to the maximum number of elements in dimension 1; j can take on the value 1 to the maximum number of elements in dimension 2, and k can take on the value 1 to the maximum number of elements in dimension 3, and so forth. Any particular cell (leaf 85) in the cell tree 78 is addressable by an address data structure, which is a list of integers, known as the indexes of a specific cell 47 in the cell tree 78.

The tree structure 78 is designed to allow the sparseness explained in the preceding section, so that all cells 47 possible need not actually be present in the cell tree 78. The interface to the cell module 70 detects an attempt to access an as yet non-existent cell of the tree and creates such a cell (leaf 85) as needed.

Accordingly, the cell module 70 provides the following interfaces for accessing and modifying the cell tree 78:

Read/Store a cell 47 (leaf 85)—This function reads or stores the values and properties of any existing or non-existing cell 47. Cells are addressed using the index addressing structure described above.

Create a dimension—This function adds a dimension (level 81, 82, 83) of the cell tree 78. All the existing cells (leaves 85), including their values and properties are remapped to accommodate the new dimension as dimension 1, so that an existing cell at address [a,b,c,d, . . .] would now be found at address [1,a,b,c,d . . .].

Delete a dimension—This function deletes a dimension of the cell tree 78. A specific subtree of the level 81, 82, 83 of the dimension to be deleted is identified to be preserved and all the other subtrees of that level are deleted. All the rest of the cells (leaves 85) in the cell tree 78 are preserved.

Copy-n-dimensional sub-array—This function copies an arbitrary sub-array from one place in the n-dimensional structure 78 to another.

Clear n-dimensional sub-array—This function clears an arbitrary sub-array from one place in tree 78 to another.

Create new spreadsheet—This function creates a new two-dimensional spreadsheet with a single cell (leaf 85).

Delete spreadsheet—This function deletes and destroys an existing spreadsheet 48.

When a primitive mathematical expression is stored in a cell 47, a calculation component of the cell module 70 is invoked to first verify the validity of the expression. On input to the calculation component, the expression is in a notation consisting of textual cell addresses combined with operators and mathematical functions. The textual cell address maps simply to the index address structure described earlier (i.e. integer indexes i,j,k . . .), so that address "A1A1A1" would map to index address structure [1, 1, 1, 1, 1, 1] and "A2C4" would map to index address structure [1,2,3,4]. Only valid mathematical expressions are actually stored in the cells 47 (leaves 85).

A dependency analysis of cell module 70 is done on mathematical expressions stored in cells 47 to determine which cells depend, either directly or indirectly, on which other cells 47. A calculation engine of cell module 70 is included to then compute contents of the resultant cells from the input cells. Furthermore, the calculation is automatically invoked whenever any cell 47 in the cell tree 78 is modified for whatever reason, to ensure that the results computed by the mathematical expressions are always up to date. The calculations are performed asynchronously, in background.

Symbol Table

A symbol table module 72 (FIG. 7) is included to map user-specified names into cell module indexes and address structures. The symbol table 72 acts as a higher-level interface to the cell module 70. It has the following functionality.

Figure 9:
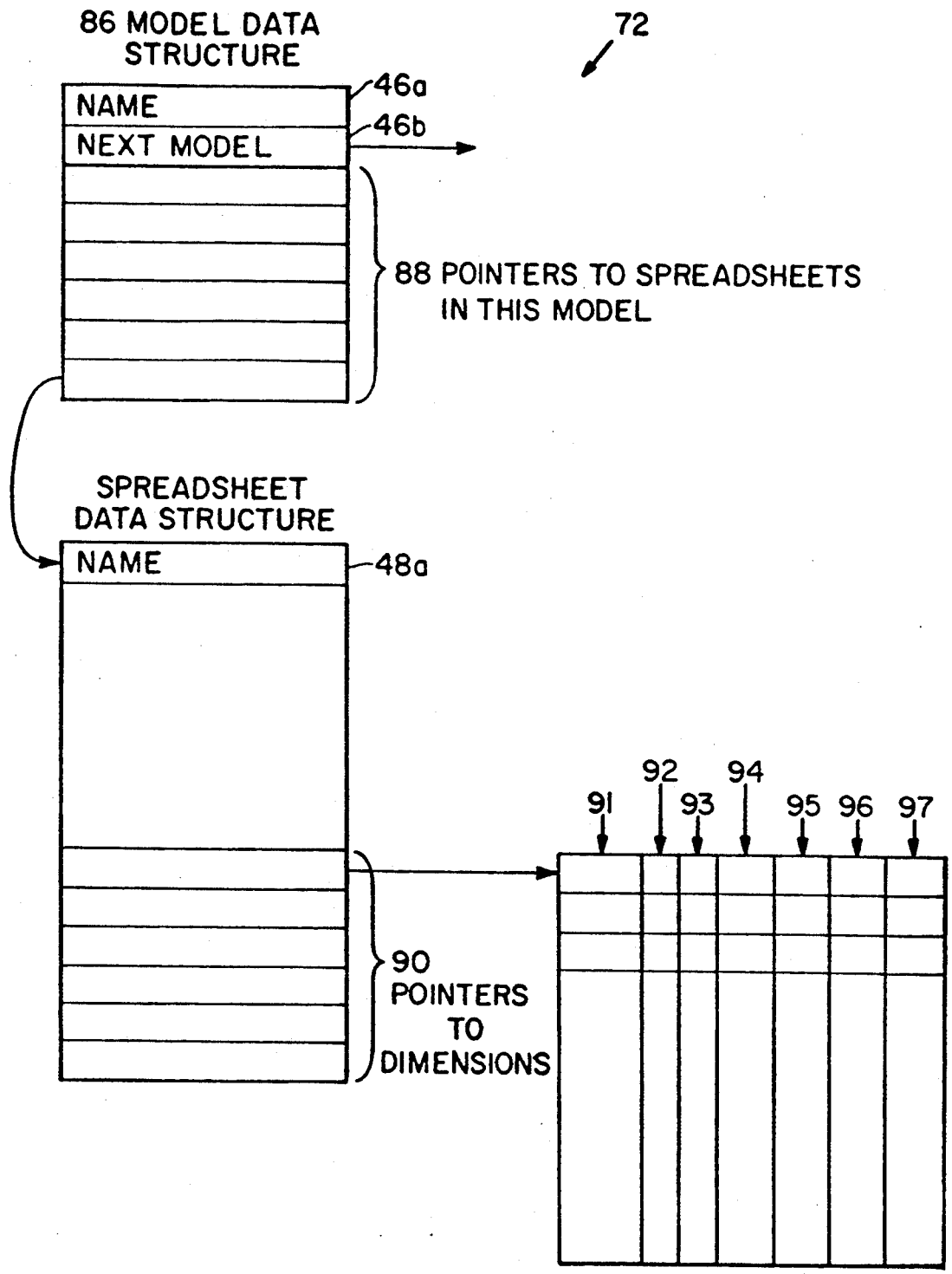
FIG. 9 is a schematic view of a symbol table data structure employed in the software program of FIG. 7.

The symbol table 72 can use any conventional approach to storing names and associating with them a set of properties. In general as shown in FIG. 9, at the top level 86 is a partitioning of the names by a named model 46. Within a model 46a, there is a second level partitioning by spreadsheet 48 within the model as shown in FIG. 1b. As shown in FIG. 9, the second level partitioning may be implemented by pointers 88 to the spreadsheets 48 in a model 46a. And within a spreadsheet 48a, there is a partitioning by dimensions 58 of the spreadsheet 48a. That is, there are pointers 90 to the dimensions 58 of the spreadsheet 48a. For each dimension, the symbol table 72 provides names of items. And by item name 91, the symbol table 72 provides a pointer 92 to a parent item, a pointer 93 to the first child item, a pointer 94 to the sibling item, an indication 95 of the cell tree dimension to which the item maps, a beginning offset 96 in the cell tree dimension, and an ending offset 97 in the cell tree dimension as illustrated in FIG. 9.

To look up a name, it is necessary to know to what model 46 it belongs. When a name is looked up in the symbol table 72, it is possible to determine to which dimension 58 of what spreadsheet 48 it belongs.

All names except model and spreadsheet names will belong to a specific dimension 58 of a specific spreadsheet 48. During user construction of a spreadsheet, for each entered name, the symbol table 72 records: the cell tree 78 in the cell module 70 to which the name belongs, the dimension (or level of the tree) to which the name belongs, and the index or index pair to which the name belongs.

If a name is an item name, it will always map to a single index along a dimension. If a name is a group or dimension name, then it will map to a pair of indices along a dimension, corresponding to the lower and upper bounds of that dimension that the name corresponds to. In the case of a dimension name, these will actually be the first and last index in the dimension.

The symbol table also accepts the full reference notation used in mathematical expressions 45 to connote any multidimensional subset of the multidimensional spreadsheet. This reference notation is the delimited list of names with at most one name from each dimension as described previously. Where a dimension is omitted from a reference, the reference is interpreted to mean all items in that dimension.

The symbol table module translates such a notation into the corresponding cell module address structure as described above. This aspect of the symbol table module is used in the mathematical expression module to analyze and process user supplied mathematical expressions.

View Module

The view module 74 (FIG. 7) uses the above components to implement the actual view on the display unit 52 (FIG. 1a) screen. The screen view relies on a two-phase approach, referred to as the layout phase and the display phase described next.

The layout phase: Depending on the current arrangement of the dimension icons 12 in the dimension areas 32, 34, 16, the view layout phase accesses the symbol table 72 for each dimension in sequence, and creates a data structure mapping the location of all the row labels, column headers, cells and other elements onto the screen. During the layout phase, items which have been temporarily hidden or items of collapsed groups are simply left out of the layout data structure and consequently not displayed.

The data structure records, for each position on the screen, the address of the cell from the cell module 70 that should be displayed there; as well as for each label on the screen, the symbol table entry that should be displayed there. Items belonging to collapsed groups and items temporarily hidden are not represented in the structure.

The display phase: The display phase processes the layout data structure (i.e. sets the bitmap 50 (FIG. 1a) accordingly) and actually displays the information on the display unit 52 screen, using up to date values for the cells 47 as generated by the cell module 70, and up to date values for the item names as generated by the symbol table 72. Temporarily hidden items, and items belong to collapsed groups are not included in the layout data structure and so are not displayed.

The layout phase is invoked whenever user actions would dictate a change in the layout of the view display. The display phase is invoked whenever the operating system 19 window manager determines that the window needs to be redisplayed, or the cell module 70 notifies the view module 74 that the cell values have changed.

Mathematical expression module

The mathematical expressions 45 supplied by the user are in a higher level notation than the primitive mathematical expressions implemented in the cell module 70. The mathematical expression module 76 manages the mapping and remapping of the user's expression notation and the cell module's implementation. When an expression 45 is entered by the user, the expression undergoes the following processing.

The math expression module 76 uses conventional parsing techniques to determine the validity of the expression 45 supplied, and rejects invalid expressions. Any mathematical expressions 45 containing errors of any kind are flagged internally. These flags are used during the display of the mathematical expressions in lower window area 36 of the view display to select which, if any, icon to display to the left of the math expression 45.

Math expressions 45 which are accepted are then analyzed to determine their scope in the cell tree 78, based on the output side 30 (FIG. 4a) of the expression.

In addition any restriction or exclusion clauses (e.g. "IN" and "SKIP" FIGS. 4b, 5c) are applied to the scope yielding a final scope for the expression.

The scope of the new mathematical expression is then compared to the scope of all previously existing high level mathematical expressions 45. If cells 47 are found where there is overlap, these cells in the cell tree 78 are marked. The new mathematical expression 45 is also marked. The list of mathematical expressions 45 overlapping with the newly added math expression is also recorded.

The module 76 then iterates through all the cells 47 corresponding to the scope which were not in collision and uses the cell module 70 to insert a primitive mathematical expression into each of those cells. The primitive mathematical expression so stored is determined from the input side 28 of the user-supplied mathematical expression 45. If the mathematical expression 45 was a recurrence expression, then the primitive expressions created will reflect this, i.e. the primitive expressions will compute their values accordingly. In other words, the recurrence expressions do not require any additional processing from the cell module 70, they only effect the exact way in which the user's mathematical expression is mapped to the primitive expression.

The cell module 70 is then relied upon to compute the results from the user-supplied mathematical expressions.

Whenever the structure of dimensions 58, the number of dimensions 58, or any user-supplied mathematical expressions 45 are changed by the user, the math module 76 is invoked to bring up to date all the cells 47 which may be affected.

Upon user request the mathematical expression module 76 will display the list of mathematical expressions which overlap with any particular one as previously determined and marked. Included in the display, the module 76 prompts the user to specify desired formulas for the cells in question as discussed in FIG. 5b above. Upon subsequent user request, the math module 76 uses the input user specifications and the cell tree 78 to add exclusion clauses to the formulas affected, to eliminate the overlap.

Example Implementation

Figure 10:
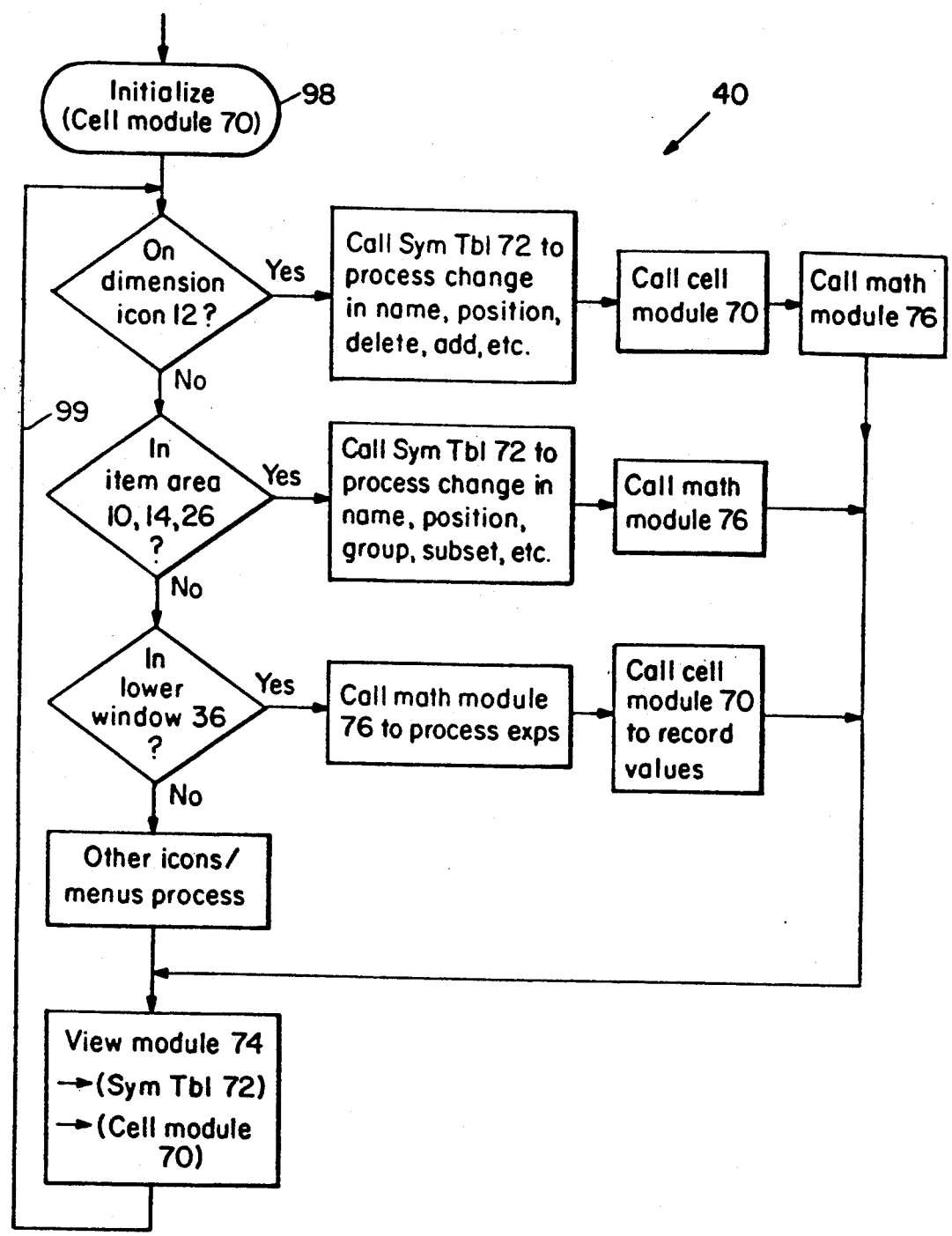
FIG. 10 is a flow diagram of a main working portion of the software program of FIG. 7.

According to the foregoing, implementation may be generally outlined as illustrated in the flow diagram of FIG. 10. It is understood that the program implementation design of FIG. 10 is by way of example and not limitation, and that various other implementations based on the foregoing discussion are within the purview of those skilled in the art. It is further understood that program implementation may vary depending on processor 19 (FIG. 1a) operation, programming procedures, function calls, module organization and design, and the like.

Referring to FIG. 10 if the user is working on a previously formed spreadsheet 38, the software program 40 at 98 initializes cell tree 78 of that spreadsheet through cell module 70. If the user is originating or forming a new spreadsheet 48, then initialization 98 of software program 40 establishes a cell tree 78 for the new spreadsheet 48 through cell module 70. Entries in the symbol table 72 are initialized and view module 74 generates pertinent screen views accordingly.

For each user command or detected operation of an input device on displayed entities (icons, menus and the like) in the screen view, software program 40 executes a main working loop 99 (FIG. 10). The main working loop 99 tests for selection and/or repositioning of a dimension icon 12, including newly requested dimension icons. Upon user repositioning, renaming, adding or deleting of a subject dimension icon 12, software program 40 calls symbol table 72 to process the change in name, position, deletion, addition and so forth. Thereafter, cell module 70 is called to update the cell tree 78. In turn, math module 76 is called to update values of the cells of cell tree 78.

Main working loop 99 also detects for user selection/operation in the item areas 10, 14, 26 of a spreadsheet screen view. In response to items being repositioned, renamed or grouped by the user, software program 40 calls symbol table 72 to process the changes in name, position, group, subset and so forth. Thereafter, main program 40 calls the math module 76 to update cell values in the cell tree 78.

Main working loop 99 also tests for user activity in the lower window 36 of the spreadsheet screen view. In response to user addition or modification of mathematical expressions 45 in the lower window 36, software program 40 calls the math module 76 to process the subject mathematical expressions. Subsequently, software program 40 calls cell module 70 to update and record the cell values in the cell tree 78.

Main working loop 99 similarly processes user operation of other icons and menu selections as discussed previously. At the end of main working loop 99, software program 40 calls view module 74 to generate and display the pertinent spreadsheet screen view. In particular, view module 74 relies on symbol table 72 and cell module 70 for the latest changes to the spreadsheet made by software program 40 in response to user interaction therewith.

Software program 40 continuously monitors user interaction with the spreadsheet screen view and executes main working loop 99 in response to detected user interaction. As a result, software program 40 provides the formation and display of various arrangements of a spreadsheet under user control. Sign-off and memory storage of spreadsheet data is subsequently performed by methods and means common in the art.

While the invention has been particularly shown and described with reference to a preferred embodiment thereof, it will be understood by those skilled in the art that various changes in form and details may be made therein without departing from the spirit and scope of the invention as defined by the appended claims. For example at the cell module 70 level, substitute notations for the primitive notations are suitable. In any case, the mathematical expression module 76 is configured to provide mapping between the user notation and cell module 70 notation as needed.

We claim

1. In a computer system having a digital processor, input means coupled to the digital processor and a display unit for displaying a multidimensional spreadsheet from the digital processor, data processing apparatus comprising:

a working screen view displayable on the display unit by the digital processor and having a) at least one dimension, each dimension being formed of a respective set of user defined category items that define a user desired category, and b) for each dimension, a corresponding icon for identifying the dimension, depending on screen view position of the corresponding icon each dimension of the working screen view is displayed on an axis selected from a horizontal axis, a vertical axis and an orthogonal axis in the screen view, a user through the input means effecting positioning of the corresponding icon in the screen view, there being a change in axis along which a dimension is displayed with a change in screen view position of the corresponding icon; and computer means responsive to a user through the input means positioning each icon in the screen view and for displaying in the same screen view on the display unit a dimension along an axis based on position of the corresponding icon in the screen view.

2. Apparatus as claimed in claim 1 wherein each icon has a label which is user definable.

3. Apparatus as claimed in claim 1 wherein each of the user defined category items of a dimension is displayed as a distinct node along the axis along which the dimension is displayed, each node defining a different position along the axis.

4. Apparatus as claimed in claim 1 wherein each item of a dimension is user definable through the input means.

5. Apparatus as claimed in claim 1 wherein the working screen view has a first dimension and a second dimension displayed on parallel axes, the first dimension having a corresponding first icon and the second dimension having a corresponding second icon, user defined category items of the second dimension providing a set of subdivision items for each user defined category item in the first dimension when the second icon is positioned adjacent the first icon in the screen view; and the computer means being responsive to a swapping of position of the first icon and the second icon by subdividing each user defined category item in the second dimension associated with the second icon by the user defined category items of the first dimension associated with the first icon.

6. Apparatus as claimed in claim 1 wherein the working screen view further includes, for each axis, a predefined region in which icons are positionable therein; and the computer means being responsive to positioning of an icon in a predetermined region by displaying the dimension of the icon along an axis corresponding to the redefined region.

7. Apparatus as claimed in claim 6 wherein the computer means is responsive to an order of adjacent icons in a predefined region such that:

(a) in response to a user positioning one icon leftward another icon in the predefined region corresponding to the vertical axis in the working screen view, the computer means establishes a row extending from the vertical axis for each user defined category item in the dimension of the one icon and subdivides each established row with the user defined category items in the dimension of the other icon;

(b) in response to a user positioning a first icon above a second icon in the predefined region corresponding to the horizontal axis in the working screen view, the computer means establishes a column extending from the horizontal axis for each user defined category item in the dimension of the first icon and subdivides each established column with the user defined category items in the dimension of the second icon; and (c) in response to a user positioning a desired icon leftward an adjacent icon in the predefined region corresponding to the orthogonal axis in the working screen view, the computer means establishes, for each item in the dimension of the desired icon, a matrix of rows and columns from the vertical and horizontal axes and subdivides each established matrix with the items in the dimension of the adjacent icon.

8. Apparatus as claimed in claim 1 wherein for each user defined category item in a dimension displayed along the horizontal axis, the working screen view provides a row extending from the horizontal axis, and for each user defined category item in a dimension displayed along the vertical axis, the working screen view provides a column extending from the vertical axis; and the apparatus further comprising selection means for enabling a user, through the input means, to select one of a whole row and a whole column in the working screen view based on the corresponding icon.

9. Apparatus as claimed in claim 8 wherein said selection means further enables a user, through the input means, to select portions of rows and columns in the working screen view according to corresponding icon.

10. Apparatus as claimed in claim 1 further comprising means for forming and adding a new user defined category item to a user desired dimension displayed along an axis in the working screen view; and the computer means being responsive to new user defined category items formed by the forming and adding means by displaying the new items in dimensions along respective axes of the working screen view.

11. Apparatus as claimed in claim 10 wherein the forming and adding means includes a dispenser icon for generating a series of user desired new user defined category items, the dispenser icon enabling the user to interactively define new items.

12. Apparatus as claimed in claim 10 wherein the new items in the working screen view include at least one of a series of number, a series of letters, a series of combinations of numbers and letters, a series of years, a series of quarters, a series of months, a series of abbreviations of months, a series of days of the week, and a series of abbreviations of the days of the week.

13. Apparatus as claimed in claim 1 further comprising means for adding to the working screen view icons for identifying new dimensions, the icons for identifying new dimensions being user positionable through the input means and user redefinable through the input means.

14. Apparatus as claimed in claim 1 wherein the working screen view further includes a calculation portion separate from an area covered by the axes, the calculation portion providing a plurality of user established mathematical expressions, established by the user through the input means, for relating information of certain items of displayed dimensions to information of other items.

15. Apparatus as claimed in claim 4 wherein in the working screen view each user defined category item has a label, and in response to user changing the label of an item in a displayed dimension in the working screen view, the computer means changes each occurrence of the label of the item in the mathematical expressions in the calculation portion of the working screen view.

16. Apparatus as claimed in claim 14 wherein the mathematical expressions include references to user defined category items of displayed dimensions, the references for referencing information of the corresponding items.

17. Apparatus as claimed in claim 14 wherein:
the plurality of mathematical expressions includes working mathematical operations involving information of items of a certain displayed dimension; and
in response to addition of new user defined category items to the certain dimension in the working screen view, the computer means applies the working mathematical operations to information of the new items.

18. Apparatus as claimed in claim 14 wherein the mathematical expressions include a restriction clause and an exclusion clause, the restriction clause specifying application of a mathematical expression to certain items, the exclusion clause specifying application of a mathematical expression to all except certain items;
the computer means being responsive to a restriction clause in a mathematical expression by applying the mathematical expression to only information of certain items, and being responsive to an exclusion clause in a mathematical expression by applying the mathematical expression to information of all except certain items.

19. Apparatus as claimed in claim 14 wherein the calculation portion further includes error checking means for determining and indicating errors in the mathematical expressions.

20. Apparatus as claimed in claim 19 further comprising solution means for displaying in the working screen view solutions to errors indicated by the error checking means and for correcting mathematical expressions upon user selection of an indicated solution through the input means.

21. Apparatus as claimed in claim 14 wherein the calculation portion includes, for each mathematical expression, an indication adjacent the mathematical expression for indicating whether a conflict exists in the mathematical expression.

22. Apparatus as claimed in claim 14 wherein the mathematical expressions include dimension based expressions which define data of an item of a displayed dimension from data of other items of the dimension, each item being indicated with respect to its position in the dimension relative to positions of other items in the dimension.

23. Apparatus as claimed in claim 14 wherein:
a mathematical expression includes a user defined group name to indicate a user desired set of items of a dimension;
the computer means being responsive to a group name in a mathematical expression by applying the mathematical expression to information of each item in the user desired set of items corresponding to the group name.

24. Apparatus as claimed in claim 23 further comprising means for generating a user desired relationship among information of each item indicated by a group name; and
the computer means being responsive to the processing means by forming a summary item corresponding to the relationship generated by the processing means and displays an indication of the summary item in the working screen view in the dimension of the set of items indicated by the group name.

25. Apparatus as claimed in claim 24 wherein in response to certain user input through the input means, the computer means further alternates display in the working screen view, between (a) the dimension having the set of items together with the summary item and (b) the dimension with the summary item in place of the set of items corresponding to the group name; the computer means alternating display between (a) and (b) upon each subsequent certain user input through the input means.

26. Apparatus as claimed in claim 24 wherein the relationship generated by the processing means includes either (i) a total, (ii) an average, (iii) a determination of minimum, (iv) a determination of maximum, or (v) a count of and standard deviation of the items corresponding to a group name.

27. Apparatus as claimed in claim 1 further comprising a computer procedure executable by the digital processor for providing a user definable group name to a user selected set of items of a dimension along an axis, the working screen view displaying the group name adjacent the dimension along the axis and the computer means responsive to use of the group name to indicate the set of selected items for which the group name was provided.

28. Apparatus as claimed in claim 1 wherein:
one of plural icons identifying respective dimensions along the orthogonal axis is user selectable; and
the computer means, in response to selection of an icon identifying a dimension along the orthogonal axis, enabling display of a succession of matrixes corresponding to items of the dimension, the succession of matrixes being displayed in the working screen view one matrix at a time upon user command.

29. Apparatus as claimed in claim 28 wherein the working screen view further includes an indication of position of the item corresponding to a displayed matrix relative to a last item in the dimension.

30. Apparatus as claimed in claim 28 wherein the working screen view further includes graphical elements for displaying a next and a previous matrix in the succession of matrices;
items of the dimension having an order of first through last; and
during display of the matrix corresponding to the last item of the dimension, the graphical elements providing an indication that the matrix corresponds to the last item of the dimension and is the last displayable matrix of the succession of matrices.

31. In a computer system having a digital processor, input means coupled to the digital processor and a display unit for displaying a multidimensional spreadsheet from the digital processor, data processing apparatus comprising:
a working screen view displayed on the display unit and having multiple axes and a plurality of regions, each region defining a reference position from which location in the screen view is determined, there being a different reference position for each axis of the screen view such that each reference position corresponds to one axis;
a plurality of user defined indicators in the working screen view, each indicator being displayed in the working screen view and providing an indication of a series of items of a desired category, position of the indicators in the working screen view being changed by a user through the input means such that the indicators are user repositionable in the working screen view; and
computer means responsive to positioning of the indicators in the working screen view with respect to the reference positions in the working screen view such that, in response to a user positioning an indicator in one of the reference positions in the working screen view, the computer means displays in the same working screen view the series of items indicated by the indicator along the axis corresponding to the reference position, different items in the series defining different positions on the axis, the series of items being displayed along a different axis in response to user changing position of the corresponding indicator to another of the reference positions.

32. Apparatus as claimed in claim 31 wherein:
the reference positions include (i) a first predefined area for a horizontal axis of the working screen view, (ii) a second predefined area for a vertical axis of the working screen view, and (iii) a third predefined area for an orthogonal axis of the working screen view; and
(a) in response to a user positioning a desired indicator in the first predefined area, the computer means displays the series of items corresponding to the indicator along the horizontal axis;
(b) in response to a user positioning a desired indicator in the second predefined area, the computer means displays the series of items corresponding to the indicator along the vertical axis; and
(c) in response to a user positioning a desired indicator in the third predefined area in the working screen view, the computer means forms from the series of items corresponding to the desired indicator a series of positions along the orthogonal axis, each item of the series forming a different position on the orthogonal axis, and for each position on the orthogonal axis there being a matrix of intersecting rows and columns, each matrix having (i) a horizontal axis formed of a series of items corresponding to an indicator positioned in the first predefined area in the working screen view, different items providing different positions on the horizontal axis from which columns of the matrix extend, and (ii) a vertical axis formed of a series of items corresponding to another indicator positioned in the second predefined area in the working screen view, different items providing different positions along the vertical axis from which rows of the matrix extend, each matrix for holding certain information of the corresponding item.

33. Apparatus as claimed in claim 31 wherein in response to a user positioning in a desired order a plurality of indicators in one of the reference positions in the working screen view, the ordered plurality having a first indicator followed by at least a second indicator, such that a sequence of indicators is established in the reference position, the computer means (a) displays in the working screen view a series of items corresponding to the first indicator along the axis corresponding to the reference position, each item in the series being a different position on the axis and (b) displays in the working screen view a related axis for each of other said indicators in said sequence, each related axis having positions defined by the different items in the series of items corresponding to the respective indicator, such that for each position on an axis formed from a series of items of a previous indicator in said sequence, the computer means forms a sub-axis to the axis, from the series of items of a succeeding indicator, each item in the series of items of the succeeding indicator defining a different position on the sub-axis.

34. Apparatus as claimed in claim 31 wherein the computer means includes:
- a cell module for providing association between user desired information and positions along axes formed from indicators positioned in the reference positions in the working screen view;
- a symbol table for translating by cross-referencing user specified names of items as displayed in the working screen view to positions along axis formed from indicators positioned in the reference positions in the working screen view, names of items being changed as desired; and
- display defining means for updating the working screen view in response to a user changing names of items and repositioning indicators with respect to the reference positions in the working screen view, the display defining means being coupled to the symbol table to obtain therefrom axis positions of user specified items names, and coupled to the cell module to obtain therefrom user desired information to be displayed at the axis position obtained from the symbol table, such that an updated working screen view retains user desired information associated with respective positions along axes and displays changed items names and changed axes along which series of items are displayed in response to positions of corresponding indicators with respect to the reference positions in the working screen view.

35. In a computer system, a method of displaying a multidimensional spreadsheet comprising the steps of:
providing a plurality of user defined indicators in a working screen view, each indicator for indicating a series of category items displayable along an axis in the working screen view, axis along which a series of category items is displayed depending on position of the indicator in the working screen view, the series of items being displayed along a different axis in response to change of position of the corresponding indicator in the working screen view, and each item having a name which is user changeable;

storing in memory user desired information for items of different indicators in the working screen view, information of each item being stored in the memory according to memory index; and in response to user positioning of indicators in the working screen view:
(a) cross-referencing names of items displayed in the working screen view to respective memory index for accessing from memory corresponding information of said items;
(b) accessing from memory, information for items of indicators in the working screen view; and
(c) displaying in the same working screen view (i) a series of items along respective axes according to position of indicators in the working screen view, and (ii) information corresponding to the items in areas extending from respective axes according to position of items along respective axes.

36. A method as claimed in claim 35 wherein position of each indicator is with respect to predefined areas of the working screen view, there being a different predefined area for each axis of the screen view such that each predefined area corresponds to a different axis, and a series of items corresponding to an indicator is displayed along an axis as a function of position of the indicator with respect to a predefined area corresponding to the axis.

37. A method as claimed in claim 35 wherein there are up to 12 axes along which series of items are displayable in the working screen view.

38. A method as claimed in claim 37 wherein the axes include subaxes of a horizontal axis, vertical axis and orthogonal axis.

* * * * *

UNITED STATES PATENT AND TRADEMARK OFFICE
CERTIFICATE OF CORRECTION

PATENT NO. : 5,317,686
DATED : May 31, 1994
INVENTOR(S) : R. Pito Salas, Glenn D. Edelson, Paul S. Kleppner, Robert S. Shaver It is certified that error appears in the above-indentified patent and that said Letters Patent is hereby corrected as shown below:

```
     Column 20, Claim 6, line 47 after "the" change
"redefined" to read --predefined--.
     Column 21, Claim 12, line 43 after the first occurrence
of "a series of" change "number" to read --numbers--.
     Column 21, Claim 15, line 62 after "claim" change "4" to
read --14--.
     Column 22, Claim 24, line 62 after "comprising" insert
the word --processing--.
     Column 22, Claim 24, line 68 after "and" change
"displays" to --displaying--.
     Column 25, Claim 34, line 26 after "specified" change
"items" to read --item--.
     Column 25, Claim 34, line 32 after "changed" change
"items" to read --item--.
```

Signed and Sealed this

Twentieth Day of September, 1994

Attest:

BRUCE LEHMAN

*Attesting Officer*          *Commissioner of Patents and Trademarks*